US010649890B2

(12) United States Patent
Ogawa

(10) Patent No.: US 10,649,890 B2
(45) Date of Patent: May 12, 2020

(54) INFORMATION PROCESSING SYSTEM, STORAGE CONTROL APPARATUS, STORAGE CONTROL METHOD, AND STORAGE CONTROL PROGRAM

(71) Applicant: NEC CORPORATION, Tokyo (JP)

(72) Inventor: Shugo Ogawa, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 146 days.

(21) Appl. No.: 15/568,150

(22) PCT Filed: Apr. 13, 2016

(86) PCT No.: PCT/JP2016/061910
§ 371 (c)(1),
(2) Date: Oct. 20, 2017

(87) PCT Pub. No.: WO2016/175028
PCT Pub. Date: Nov. 3, 2016

(65) Prior Publication Data
US 2018/0107593 A1 Apr. 19, 2018

(30) Foreign Application Priority Data

Apr. 28, 2015 (JP) .................. 2015-091752

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS 5,937,425 A    8/1999   Ban
6,647,458 B1 * 11/2003  Glynn ................. G06F 11/3419
                                                     702/186
(Continued)

FOREIGN PATENT DOCUMENTS

JP    2002-268924 A    9/2002
JP    2008-293371 A    12/2008
(Continued)

OTHER PUBLICATIONS

Sang-Won Lee et al., "A log buffer based flash translation layer using fully associative sector translation", ACM Transactions on Embedded Computing Systems, 2007, vol. 6, No. 3, 27 pages.
(Continued)

*Primary Examiner* — Jared I Rutz
*Assistant Examiner* — Stephanie Wu
(74) *Attorney, Agent, or Firm* — Sughrue Mion, PLLC

(57) ABSTRACT

An apparatus of this invention is directed to a storage control apparatus that improves the access performance of a storage medium and prolongs the life of the storage medium. The storage control apparatus includes a determiner that determines whether to estimate that data at a logical address area in a logical address space used by a host computer to access a storage medium is fragmented and stored in a plurality of physical address areas in a physical address space used in the storage medium, and a data rearrangement unit that reads the fragmented data by designating a logical address area corresponding to the fragmented data which has been estimated to be fragmented and stored in the plurality of physical address areas in the physical address space, and instructs the storage medium to write the read fragmented data in the
(Continued)

logical address area while controlling other write operations, so that the fragmented data is written in continuous physical address areas in the storage medium.

7 Claims, 26 Drawing Sheets

(51) Int. Cl.
  *G06F 13/10* (2006.01)
  *G06F 12/0802* (2016.01)
(52) U.S. Cl.
  CPC .......... *G06F 3/0656* (2013.01); *G06F 3/0679* (2013.01); *G06F 12/0802* (2013.01); *G06F 13/10* (2013.01); *G06F 2212/1016* (2013.01); *G06F 2212/7203* (2013.01); *G06F 2212/7205* (2013.01); *G06F 2212/7211* (2013.01)

(56) References Cited

U.S. PATENT DOCUMENTS

| | | | |
|---|---|---|---|
| 9,767,021 B1* | 9/2017 | Wu | G06F 12/0848 |
| 10,007,462 B1* | 6/2018 | Van Gaasbeck | G06F 3/0616 |
| 2008/0091875 A1* | 4/2008 | Mannenbach | G06F 12/126 |
| | | | 711/113 |
| 2008/0109602 A1* | 5/2008 | Ananthamurthy | G06F 11/1076 |
| | | | 711/114 |
| 2008/0155175 A1 | 6/2008 | Sinclair et al. | |
| 2008/0235464 A1* | 9/2008 | Traister | G06F 12/0246 |
| | | | 711/154 |
| 2008/0294865 A1 | 11/2008 | Yoshida | |
| 2008/0307164 A1 | 12/2008 | Sinclair | |
| 2009/0198738 A1* | 8/2009 | Berger | G06F 16/2453 |
| 2011/0258391 A1* | 10/2011 | Atkisson | G06F 11/108 |
| | | | 711/118 |
| 2012/0047336 A1* | 2/2012 | Suzuki | G06F 11/3414 |
| | | | 711/154 |
| 2012/0303918 A1* | 11/2012 | Reed | G06F 3/0608 |
| | | | 711/165 |
| 2013/0232309 A1* | 9/2013 | Vijayan | G06F 3/0608 |
| | | | 711/159 |
| 2013/0282955 A1* | 10/2013 | Parker | G06F 12/0246 |
| | | | 711/103 |
| 2014/0189263 A1* | 7/2014 | Shaharabany | G06F 5/14 |
| | | | 711/154 |
| 2014/0195725 A1* | 7/2014 | Bennett | G06F 12/0246 |
| | | | 711/103 |
| 2014/0281212 A1* | 9/2014 | Schreter | G06F 3/0674 |
| | | | 711/112 |
| 2015/0186270 A1* | 7/2015 | Peng | G11C 16/16 |
| | | | 711/3 |
| 2016/0283366 A1* | 9/2016 | Nguyen Tien | G06F 12/0246 |
| 2017/0344478 A1* | 11/2017 | Feng | G06F 12/16 |

FOREIGN PATENT DOCUMENTS

| | | |
|---|---|---|
| JP | 2010-515163 A | 5/2010 |
| JP | 2014-013585 A | 1/2014 |

OTHER PUBLICATIONS

Jeong-UK Kang et al., "The Multi-streamed Solid-State Drive", 6th USENIX Workshop on Hot Topics in Storage and File Systems (HotStorage), 2014, 5 pages.
International Search Report of PCT/JP2016/061910 dated Jul. 12, 2016 [PCT/ISA/210].

* cited by examiner

FRAGMENTATION STATE MANAGEMENT TABLE 303

| | TOTAL WRITE AMOUNT |
|---|---|
| | 1048592KB 410 |

| FIRST LBA 421 | FRAGMENT COUNT 422 | IMMEDIATELY PRECEDING TOTAL WRITE AMOUNT 423 | FRAGMENTATION FREQUENCY 424 |
|---|---|---|---|
| 0 × 00000000 | 1 | 65536KB | 0 |
| 0 × 00001000 | 4 | 1048576KB | 3 |
| 0 × 00002000 | 2 | 200000KB | 1 |
| ... | ... | ... | ... |

FIG. 4

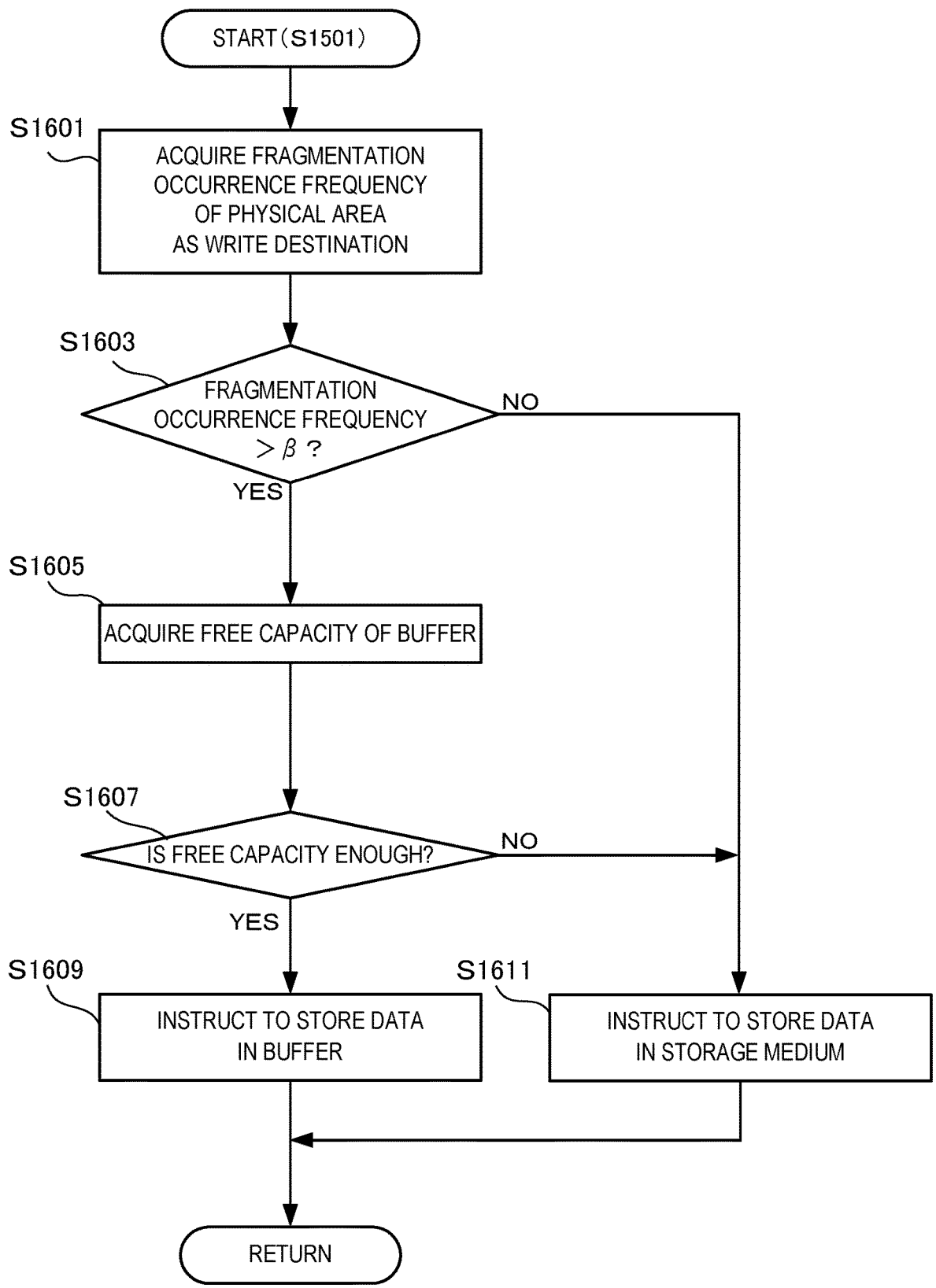
F I G. 16

FIG. 19

FRAGMENTATION STATE MANAGEMENT TABLE 1803

| | TOTAL WRITE AMOUNT | 1048576KB | 410 |

| FILE ID 1921 | FILE SIZE 1922 | TOTAL WRITE AMOUNT AT START 1923 |
| --- | --- | --- |
| 1 | 102400KB | 65536KB |
| 2 | 16KB | 1048576KB |
| 3 | 32768KB | 1000000KB |
| ... | ... | ... |

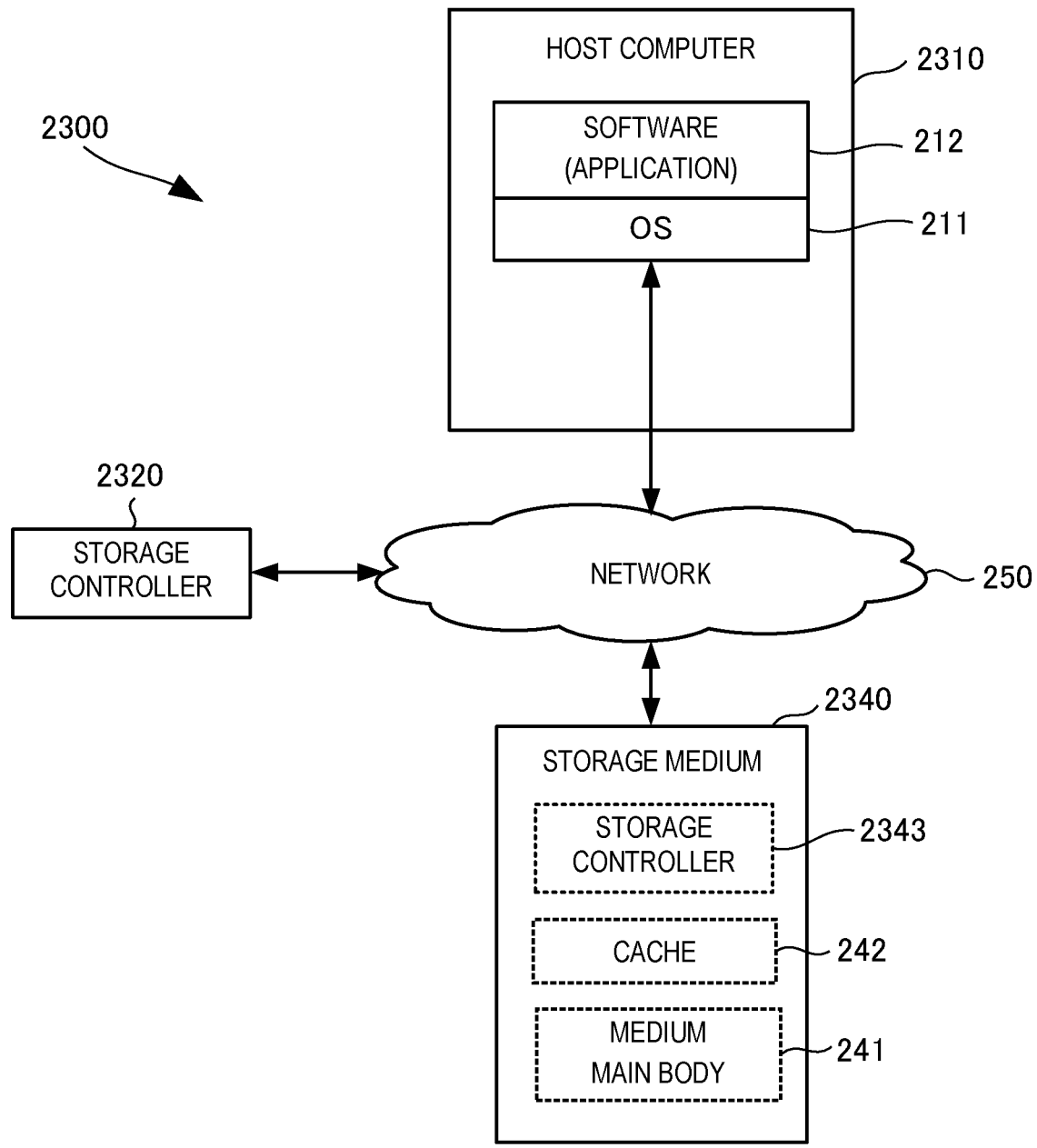
F I G. 23 ly, as in non-patent literature 2, to
INFORMATION PROCESSING SYSTEM, STORAGE CONTROL APPARATUS, STORAGE CONTROL METHOD, AND STORAGE CONTROL PROGRAM

CROSS REFERENCE TO RELATED APPLICATIONS

This application is National Stage of International Application No. PCT/JP2016/061910, filed Apr. 13, 2016, claiming priority based on Japanese patent application No. 2015-091752 filed on Apr. 28, 2015, the disclosure of which is incorporated herein in its entirety by reference.

TECHNICAL FIELD

The present invention relates to an information processing system, a storage control apparatus, a storage control method, and a storage control program.

BACKGROUND ART

Along with recent improvement in throughput of a computer system, it has been required to improve the performance of a storage medium that saves information. As a result, in recent years, for example, an SSD (Solid State Drive) using a NAND flash memory (to be referred to as a NAND flash hereinafter) as a memory element has become widespread as a high performance storage medium. In the NAND flash used as a memory element in the storage medium such as an SSD, it is necessary to erase stored old data at the time of update of the data, and an increase in erase count degrades the performance including processing of saving a valid page in a block and reduces the life of the element. To solve this problem, it is necessary to reduce the erase count and equalize the write counts of respective blocks not to excessively consume the life of a specific element.

To cope with this, in a general SSD, an FTL (Flash Translation Layer) in a controller performs access processing unique to the NAND flash, and equalization of block erase counts, that is called wear leveling. More specifically, for example, as described in patent literature 1 and non-patent literature 1, an erased block is prepared as a data storage area, and the block area is mapped on a page basis in a write-once manner in response to a write request from a host computer. The write counts are equalized by setting, as a write data storage area, a block whose erase count is smallest, among a plurality of erased blocks.

On the other hand, in order for the SSD to continuously store write data from the host computer in a write-once manner, it is necessary to perform GC (Garbage Collection) to collect a memory area storing data that has become unnecessary due to update or the like. In the SSD, in addition to general GC processing, it is necessary to perform erase processing on a block basis to reuse a memory area storing unnecessary data, and valid pages are saved in advance in a memory area outside the block. Thus, the load of GC increases in proportion to the number of pages to be saved. An increase in load of GC delays access processing in the SSD and degrades the performance. In the save processing, data is written in the NAND flash. Consequently, an increase in number of pages to be saved is one of factors in consumption of the life of the SSD.

To continuously suppress the load of GC, a state in which invalid pages are concentrated in a small number of blocks without being distributed to many blocks is maintained in updating or deleting data, thereby suppressing an increase in save processing in GC. As a method of maintaining the state in which invalid pages are concentrated in a small number of blocks, non-patent literature 2 describes a method of reducing the load of GC by adding information called the same stream ID to each set of data having the same property with respect to a write command from the host computer, selecting a storage destination block of the NAND flash in the SSD based on the stream ID, and storing the write data so that the update timings of data in each block are close to each other.

CITATION LIST

Patent Literature

Patent literature 1: U.S. Pat. No. 5,937,425

Non-Patent Literature

Non-patent literature 1: S.W. Lee, D.J. Park, T.S. Chung, W.K. Choi, D.H. Lee, S.W. Park, and H.J. Song, "A log buffer based flash translation layer using fully associative sector translation", ACM Transactions on Embedded Computing Systems, Vol. 6, No. 3, 2007

Non-patent literature 2: Jeong-Uk Kang, Jeeseok Hyun, Hyunjoo Maeng, and Sangyeun Cho, "The Multi-streamed Solid-State Drive", 6th USENIX Workshop on Hot Topics in Storage and File Systems (HotStorage), 2014

SUMMARY OF THE INVENTION

Technical Problem

In the technique described in non-patent literature 2, however, since it is necessary to alter a protocol for accessing the SSD from the host computer, and cope with both the host computer and the SSD, much cost is required to apply the technique. In addition, as in non-patent literature 2, to decide a storage destination block based on a period until write data is updated or deleted with respect to the SSD, information about the pattern and type of write access in an application executed in the host computer is required in advance. If there are a plurality of applications executed in the host computer, write data from the plurality of applications are mixed and stored in the NAND flash in the SSD. In addition, as for an application in which the property of write data in the SSD changes depending on input data, it is difficult to collect in advance the pattern of write access. That is, in an environment in which the execution statuses and combination of a plurality of applications dynamically change, it is difficult to optimize data storage in a block of the NAND flash based on the pattern and type of write access to the SSD.

The present invention enables to provide a technique of solving the above-described problems.

Solution to Problem

One aspect of the present invention provides a storage control apparatus comprising:

a determiner that determines whether to estimate that data at a logical address area in a logical address space used by a host computer to access a storage medium is fragmented and stored in a plurality of physical address areas in a physical address space used in the storage medium; and a data rearrangement unit that reads the fragmented data by designating a logical address area corresponding to the fragmented data which has been estimated to be fragmented and stored in the plurality of physical address areas in the physical address space, and instructs the storage medium to write the read fragmented data in the logical address area while controlling other write operations, so that the fragmented data is written in continuous physical address areas in the storage medium.

Another aspect of the present invention provides a storage control method comprising:

determining whether to estimate that data at a logical address area in a logical address space used by a host computer to access a storage medium is fragmented and stored in a plurality of physical address areas in a physical address space used in the storage medium; and reading the fragment data by designating a logical address area corresponding to the fragment data which has been estimated to be fragmented and stored in the plurality of physical address areas in the physical address space, and instructing the storage medium to write the read fragmented data in the logical address area while controlling other write operations, so that the fragmented data is written in continuous physical address areas in the storage medium.

Still other aspect of the present invention provides a storage control program for causing a computer to execute a method, comprising:

determining whether to estimate that data at a logical address area in a logical address space used by a host computer to access a storage medium is fragmented and stored in a plurality of physical address areas in a physical address space used in the storage medium; and reading the fragmented data by designating a logical address area corresponding to the fragmented data which has been estimated to be fragmented and stored in the plurality of physical address areas in the physical address space, and instructing the storage medium to write the read fragmented data in the logical address area while controlling other write operations, so that the fragmented data is written in continuous physical address areas in the storage medium.

Still other aspect of the present invention provides an information processing system comprising:

a storage medium;

an access unit that accesses said storage medium by designating a logical address area in a logical address space; and a storage controller that, based on the logical address area designated by said access unit, reads data from said storage medium and writes data in said storage medium, said storage controller including a determiner that determines whether to estimate that data at a logical address area in a logical address space used by said access unit to access said storage medium is fragmented and stored in a plurality of physical address areas in a physical address space used in said storage medium, and a data rearrangement unit that reads the fragmented data by designating a logical address area corresponding to the fragmented data which has been estimated to be fragmented and stored in the plurality of physical address areas in the physical address space, and instructs said storage medium to write the read fragmented data in the logical address area while controlling other write operations, so that the fragmented data is written in continuous physical address areas in said storage medium.

Advantageous Effects of Invention

According to the present invention, it is possible to improve the access performance of a storage medium and prolong the life of the storage medium.

BRIEF DESCRIPTION OF DRAWINGS

FIG. 4 is a view showing the structure of a fragmentation state management table according to the second example embodiment of the present invention;

FIG. 16 is a flowchart illustrating the procedure of storage destination decision processing according to the third example embodiment of the present invention;

FIG. 19 is a view showing the structure of fragmentation state management table according to the fourth example embodiment of the present invention;

FIG. 23 is a view showing the arrangement of an information processing system according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

[First Example Embodiment]

A storage control apparatus 100 according to the first example embodiment of the present invention will be described with reference to FIG. 1. The storage control apparatus 100 is an apparatus that controls access to a storage medium by a host computer.

Figure 1:
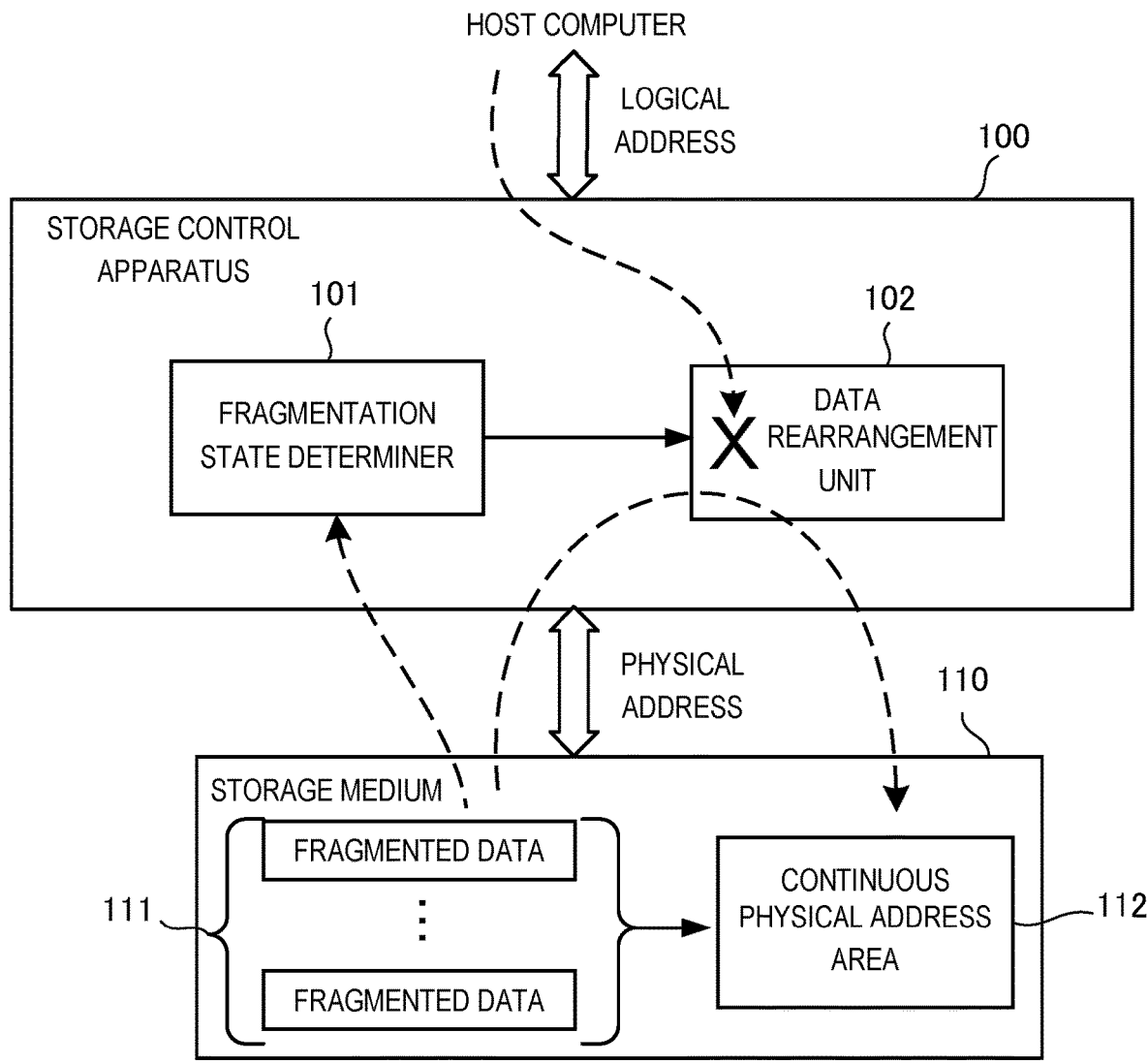
FIG. 1 is a block diagram showing the arrangement of a storage control apparatus according to the first example embodiment of the present invention.

As shown in FIG. 1, the storage control apparatus 100 includes a determiner 101 and a data rearrangement unit 102. The determiner 101 determines whether data corresponding to a logical address area in a logical address space used by the host computer to access a storage medium 110 can be estimated to be fragmented and stored in a plurality of physical address areas in a physical address space used in the storage medium 110. The data rearrangement unit 102 reads data by designating a logical address area corresponding to data 111 for which it has been determined that the data 111 can be estimated to be fragmented and stored in the physical address space, and instructs the storage medium 110 to write the data in the logical address area while controlling or restricting other write operations so that the data is written in continuous physical address areas 112 in the storage medium.

According to this example embodiment, it is possible to improve the access performance of a storage medium and prolong the life of the storage medium by monitoring write access to the storage medium, estimating the fragmentation state of the storage areas in a memory area in the storage medium, and rearranging data to cancel the fragmentation state.

[Second Example Embodiment]

An information processing system including a storage control apparatus as a storage controller in a host computer according to the second example embodiment of the present invention will be described next. In the information processing system according to this example embodiment, the storage controller estimates the fragmentation state of memory areas in a physical address space in a storage medium based on history information of access (read and write) to the storage medium by the OS (Operating System) of the host computer or an application program (to be referred to as an application hereinafter). If the fragmentation state exceeds a predetermined state, defragmentation is implemented by collectively rearranging the areas in the fragmentation state.

«Technical Premise»

Prior to a description of a storage control method according to this example embodiment, a storage control technique according to a technical premise will be explained.

In recent years, with respect to a NAND flash used as a memory element in a storage medium such as an SSD, it is necessary to erase stored old data at the time of update of data. However, erase processing for the NAND flash is performed for each block including a plurality of pages as a smallest unit of read and write processes. Therefore, when erasing or updating data stored in pages of the NAND flash, it is necessary to save the remaining pages included in the same block.

It is known that a long time is generally required to erase a block of the NAND flash, as compared with read or write processing of pages. In addition, the bit error occurrence rate increases along with an increase in erase count of the NAND flash element, and it is thus difficult to store normal data. That is, since an increase in erase count for the NAND flash degrades the performance and reduces the life of the element, it is necessary to reduce the erase count and equalize the write counts in the respective blocks not to excessively consume the life of a specific element.

To cope with these characteristics, in a general SSD, an FTL in a controller performs access processing unique to the NAND flash and performs equalization of the block erase counts, that is called wear leveling. More specifically, for example, as described in patent literature 1 and non-patent literature 1, an erased block is prepared as a data storage area, and the block area is mapped on a page basis in a write-once manner in response to a write request from the host computer. Equalization of write counts is implemented by setting, as a write data storage area, a block with the smallest erase count among a plurality of erased blocks.

On the other hand, in order for the SSD to continuously store write data from the host computer in a write-once manner, it is necessary to perform GC to collect a memory area storing data that has become unnecessary due to update or the like. In the SSD, in addition to general GC processing, it is necessary to perform erase processing on a block basis to reuse a memory area storing unnecessary data. In GC for the SSD, if a block to be collected includes a page having valid data, it is necessary to save the valid page in a memory area outside the block in order to collect the memory area on a block basis. The save processing of the valid page is implemented by read for the page of the NAND flash and write for the save destination page. That is, the load of GC increases in proportion to the number of pages to be saved. An increase in load of GC delays access processing in the SSD and degrades the performance. In the save processing, data is written in the NAND flash. Consequently, an increase in number of pages to be saved is one of factors in consumption of the life of the SSD.

To avoid the problem in GC of the SSD, continuously maintain the access performance, and prolong the life, it is important to reduce the load of GC executed in the SSD. More specifically, it is required to reduce the save processing of the page storing valid data on the NAND flash. It is necessary to perform GC in the SSD for each block of the NAND flash. Therefore, to continuously suppress the load of GC, it is necessary to maintain the state in which the pages that are invalidated as a result of updating or deleting data are concentrated in a small number of blocks instead of being distributed to many blocks. In this case, since blocks including no or few pages storing valid data continuously exist at all the time, it is possible to suppress an increase in save processing in GC.

As a method of maintaining the state, non-patent literature 2 describes a method of reducing the load of GC by adding information called the same stream ID to each set of data having the same property with respect to a write command from the host computer, selecting a storage destination block of the NAND flash based on the stream ID in the SSD, and storing write data so that the update timings of data in each block are close to each other.

In the method described in non-patent literature 2, however, since it is necessary to alter a protocol for accessing the SSD from the host computer, and cope with both the host computer and the SSD, much cost is required to apply the technique. In addition, as described in non-patent literature 2, to decide a storage destination block based on a period until write data is updated or deleted with respect to the SSD, information about the pattern and type of write access in an application executed in the host computer is required in advance. If there are a plurality of applications executed in the host computer, write data from the plurality of applications are mixed and stored in the NAND flash in the SSD. In addition, as for an application in which the property of write data in the SSD changes depending on input data, it is difficult to collect in advance the pattern of write access. That is, in an environment in which the execution statuses and combination of a plurality of applications dynamically change, it is difficult to optimize data storage in a block of the NAND flash based on the pattern and type of write access to the SSD.

«Example Embodiment»

To solve the above-described problems of the technical premise, the second to fifth example embodiments provide a technique for improving the access performance of an SSD and prolonging the life of the SSD by reducing the load of processing for saving valid data from a block to be collected in GC executed in the SSD for a memory area of a NAND flash.

More specifically, an LBA (Logical Block Address) space provided by the SSD or a storage status in the NAND flash for each of successive write access requests is monitored, and a state in which data are fragmented into many blocks in the NAND flash is canceled. In general, data such as a file having a series of meanings are stored in memory areas represented by continuous LBAs. All data included in a single file are to be updated or deleted in many cases. That is, it is considered that, among write data in the SSD, data such as a file represented by continuous or adjacent LBAs often have the same period (to be referred to as a lifetime hereinafter in this specification) from a storage operation to an update or delete operation.

The storage status of write data in the NAND flash in the SSD is monitored for each series of successive write access operations for a predetermined area or file in the LBA space. If write data are stored in each block of the NAND flash of the SSD in a write-once manner, the write data for continuous LBAs are stored in pages of the same block of the NAND flash. On the other hand, an area in which a write operation of data of a small size is intermittently performed is stored in a state in which each write data is fragmented into a plurality of blocks since write data of small amounts intermittently arrive. Since the block storing the fragmented write data is stored in a state in which another area or successively accessed data is mixed, the mixture of data having different lifetimes increases the load of GC.

To cope with this, in this example embodiment, the fragmentation count is recorded for each predetermined area in the LBA space. Alternatively, data storage in which write access operations are parallelly executed for each series of continuous areas such as a file is managed. Defragmentation is performed by re-storing all data in an area whose fragmentation count has increased to a predetermined number or more or in continuous areas in which a large amount of data is stored at the same time. The occurrence of fragmentation in each area on the LBA space and an area storing continuous data such as a file is estimated from the write data amount of the whole SSD between write requests for the same area and recorded. When storing data in the NAND flash in a write-once manner, if a block is filled with the write data, the remaining write data are stored in a different block. That is, when issuing a write request to each area on the LBA space, the total capacity of write data stored in another area on the SSD after issuing the last write request to the same area is confirmed. If the total capacity is equal to or larger than a predetermined capacity, it is determined that the write data are stored in a new block, and the fragmentation count of the area to which the write request has been issued is added. Furthermore, if a plurality of files are simultaneously written, data of the plurality of files are mixed and stored in a block, and thus fragmentation in the NAND flash in the SSD progresses as the number of files that are simultaneously written increases.

Furthermore, in this example embodiment, an area having a high fragmentation occurrence frequency is detected by collecting a history of the fragmentation counts of the respective areas. Write data for the detected area having the high fragmentation occurrence frequency are stored in a memory area prepared as a buffer. That is, data having a short lifetime and data having a long lifetime are separated by preferentially storing, in the buffer, the write data having the short lifetime and stored in the area having the high fragmentation frequency. The write data having the short lifetime and stored in the buffer is updated or deleted before it is written from the buffer into the SSD. Therefore, the write data having the short lifetime is not written in the SSD, thereby improving the access performance and prolonging the life of the SSD. On the other hand, the write data having the long lifetime which is not updated or deleted overflows and is written in the SSD. As a result, only the write data having the long lifetime is written in the SSD, thereby reducing the load of data saving in GC.

In this example embodiment, the load of data save processing in GC in the SSD is reduced by estimating the fragmentation status in the NAND flash in the SSD, performing defragmentation, and selectively buffering write data having a short lifetime, thereby improving the access performance of the SSD and prolonging the life of the SSD. To implement this, a fragmentation state estimation function, a fragmentation state management function, and a defragmentation control function are provided. The fragmentation state estimation function estimates a change in fragmentation state caused by storing write data in the SSD. The fragmentation state management function manages information of the fragmentation state of each area on the LBA space in the SSD or an execution status concerning write access for each set of continuous areas such as a file. The defragmentation control function collectively re-stores, in continuous areas in which fragmentation progresses by a predetermined amount or more, data in areas. There is also provided a storage destination decision function of deciding a storage destination by determining, based on the fragmentation state information, whether to store write data for the SSD in the buffer.

The fragmentation state estimation function estimates whether write data cause new fragmentation on the NAND flash for each predetermined area obtained by dividing the LBA space provided in the SSD or each series of continuous areas such as a file. If write data are stored in each block of the NAND flash in the SSD in a write-once manner, the continuously stored write data are stored in the same block, regardless of the storage destination LBAs. To the contrary, if data of a block size or more is written in the whole SSD between two write data for the SSD, the two write data are divided and stored in different blocks. That is, data of a write request after data of a predetermined size or more is written in the SSD is divided and stored in different blocks. Therefore, it is possible to check an approximate fragment count of write data for each area and the fragmentation state of continuous data such as a file by checking the total write amount of the SSD. With respect to a write request for the SSD, the fragmentation state estimation function checks the total capacities of all write requests issued for the SSD at the present time and at the time of the last write operation for the write destination area. If a predetermined capacity or more of data is written in the SSD after the last write operation, it is considered that data is stored in a new memory area on the NAND flash, and the fragmentation count is incremented by one. Alternatively, if the fragmentation status of the continuous data such as a file is estimated, it is determined that the degree of fragmentation is high as the number of simultaneously written files or a data amount increases.

The fragmentation state management function records, for each predetermined area obtained by dividing the LBA space provided in the SSD, information of the fragment count on the NAND flash storing data. Alternatively, the fragmentation state management function records, for each series of continuous areas such as each file, information that represents the execution status of simultaneously performed write access operations and is necessary to estimate the fragmentation status. The fragmentation state management function also manages the total write amount of the SSD, and records, for each area, information about the total write amount at the time of the last write request. In addition, the fragmentation state management function records, for each area, the latest fragmentation frequency, that is, the frequency of the write operation that causes fragmentation.

For each set of continuous areas in the SSD, the defragmentation control function continuously re-stores, in the SSD, data in an area when fragmentation progresses by a predetermined amount or more with reference to the information recorded by the fragmentation state management function. In the re-storage processing, each data in the area is read, and all the data in the area are written with respect to the file or the LBAs in which the data are originally stored while controlling or restricting other write operations. The re-stored data are rearranged in the same block on the NAND flash and continuously stored, thereby implementing defragmentation.

The storage destination decision function acquires, from the fragmentation state management function, the information of the fragmentation frequency in the area on the LBA space as a storage destination for each write request for the SSD, and changes, if the fragmentation frequency is equal to or higher than a predetermined value, the storage destination of the write data to the buffer.

The arrangement and operation of the storage control apparatus according to this example embodiment will be described in detail below with reference to FIGS. 2 to 9B.

«Information Processing System»

Figure 2:
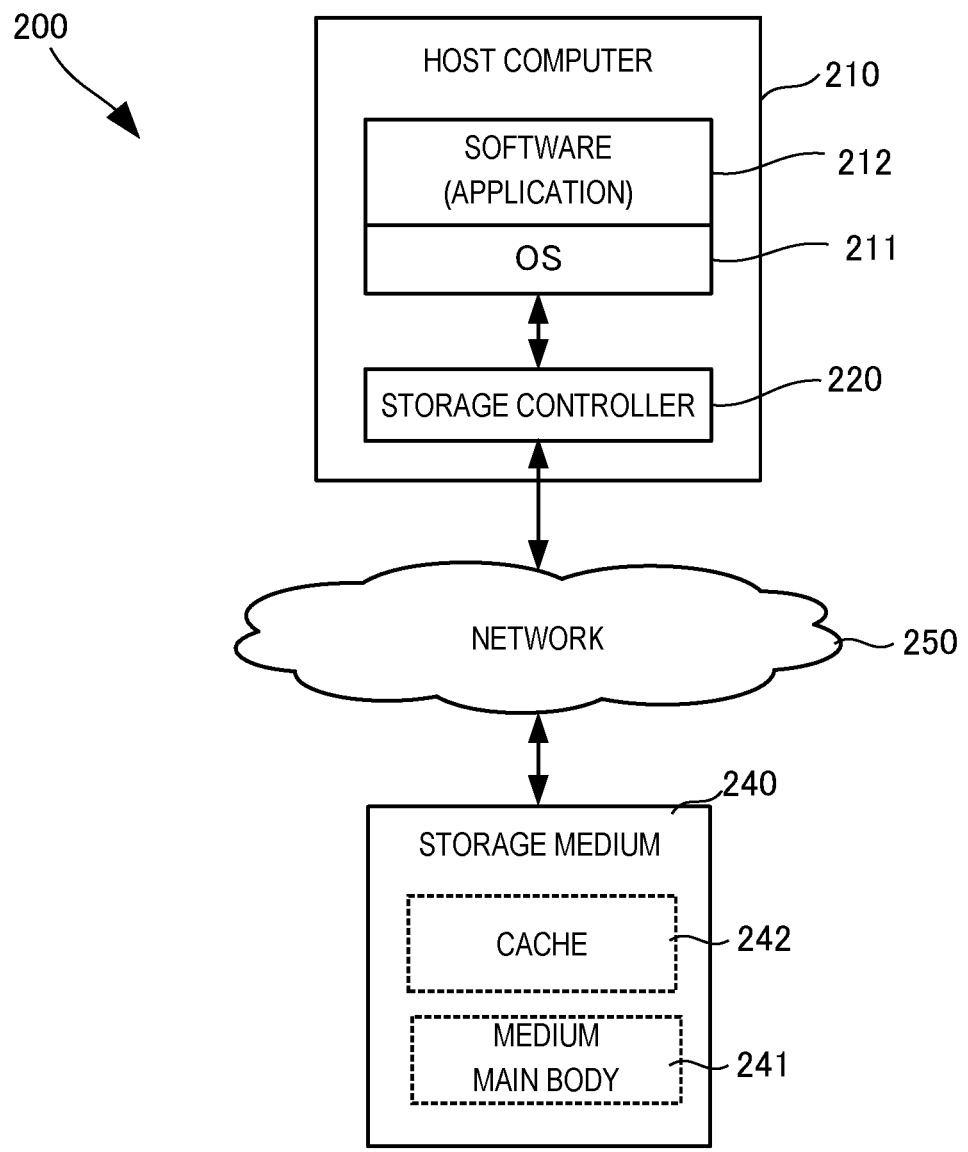
FIG. 2 is a view showing the arrangement of an information processing system according to the second example embodiment of the present invention.

FIG. 2 is a view showing the arrangement of an information processing system 200 according to this example embodiment.

Referring to FIG. 2, the information processing system 200 according to this example embodiment includes one or more host computers 210, a storage medium 240, and a network 250 that connects the host computers 210 and the storage medium 240.

Each host computer 210 includes an OS (Operating System) 211, an application 212 as software operating on the OS 211, and a storage controller 220 of this example embodiment. The storage controller 220 controls access processing including read and write for the storage medium 240 in the processing of the OS 211 and the application 212.

The storage medium 240 is a storage medium such as an SSD using a NAND flash as a memory element. Note that the storage medium 240 may include a medium main body 241 and a cache 242. The form of the network 250 is not particularly limited, and the host computer 210 and the storage medium 240 may be directly connected. Furthermore, the host computer 210 may be formed by a system or a plurality of apparatuses connected by the network 250.

«Functional Arrangement of Storage Control Apparatus»

Figure 3:
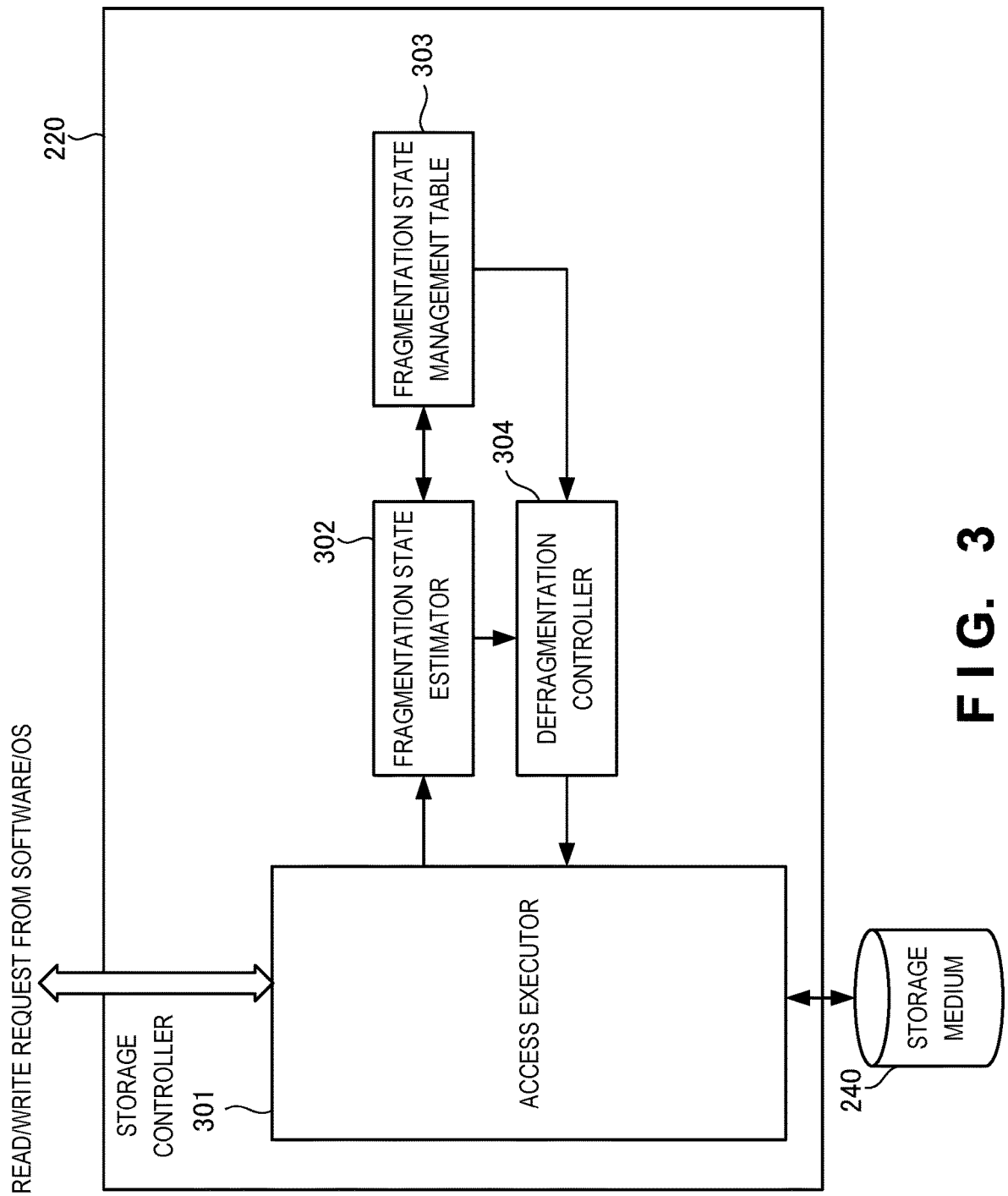
FIG. 3 is a block diagram showing the functional arrangement of a storage control apparatus according to the second example embodiment of the present invention.

FIG. 3 is a block diagram showing the functional arrangement of the storage controller 220 serving as a storage control apparatus according to this example embodiment.

Referring to FIG. 3, the storage controller 220 includes an access executor 301, a fragmentation state estimator 302, a fragmentation state management table 303, and a defragmentation controller 304.

The access executor 301 receives an access request from the OS 211 or application 212 operating on host computer 210, and performs necessary access processing for the storage medium 240. The access executor 301 reads data from an area on the storage medium 240 that is instructed by the defragmentation controller 304, and performs re-storage processing. Data can be read from the area on the storage medium 240 by issuing a request to a cache memory (not shown) for the storage medium 240, instead of directly issuing a request to the storage medium 240.

The fragmentation state estimator 302 implements the fragmentation state estimation function of estimating whether fragmentation occurs in the storage medium 240 by storing data of the write request received by the access executor 301 from the OS 211 or application 212. First, the fragmentation state estimator 302 refers to the fragmentation state management table 303. Then, the fragmentation state estimator 302 compares the total write amount of the whole storage medium 240 at the time of the last write operation for the area on the LBA space as the storage destination of the data on the storage medium 240 with the total write amount of the whole storage medium 240 at the present time. If, as a result of the comparison, the total write amount at the present time has increased by a predetermined amount or more from the total write amount at the time of the last write operation, it is determined that fragmentation occurs by storing, in the storage medium 240, the data of the write request received from the OS 211 or application 212. The fragment count corresponding to the storage destination area, that is stored in the fragmentation state management table 303, is incremented by "1".

For each predetermined area obtained by dividing the LBA space provided in the storage medium 240, the fragmentation state management table 303 records the result of estimating the fragmentation state on the NAND flash by the fragmentation state estimator 302, the total write amount of the storage medium 240 at the time of the last write request for each area, and information of the latest fragmentation occurrence frequency.

With respect to the area on the LBA space of the storage medium 240, if the fragment count recorded in a corresponding entry in the fragmentation state management table 303 is equal to or larger than a predetermined value, the defragmentation controller 304 reads all data in the area for the access executor 301. The defragmentation controller 304 controls or restricts other write operations, and instructs to rewrite the data by designating an LBA corresponding to the area on the storage medium 240.

(Fragmentation State Management Table)

FIG. 4 is a view showing the structure of the fragmentation state management table 303 according to this example embodiment. The fragmentation state management table 303 is referred to when the fragmentation state estimator 302 estimates whether fragmentation occurs in the storage medium 240.

The fragmentation state management table 303 stores, as information of the whole storage medium 240, a total write amount 410 of the storage medium 240 at the present time. The fragmentation state management table 303 has an entry for each area obtained by dividing the LBA space. Each entry stores a first LBA 421, a fragment count 422, an immediately preceding total write amount 423, and a fragmentation frequency 424. The first LBA 421 represents an area corresponding to the entry. The fragment count 422 indicates the value of the result of estimating the number of areas in the fragmentation state on the NAND flash by the fragmentation state estimator 302. The immediately preceding total write amount 423 represents the total write data amount of the storage medium 240 at the time of the last write request that has caused fragmentation. The fragmentation frequency 424 represents, as information indicating the fragmentation occurrence frequency, the frequency of the write operation that has caused fragmentation for a predetermined time.

As for the fragment count 422, "0" is set as a value in the initial state in which no data is stored in each area on the LBA space, and "1" is set as a fragmentation count when data is stored for the first time. Subsequently, if the fragmentation state estimator 302 determines that fragmentation has occurred in an area due to a new write operation, "1" is added to the fragment count 422 to indicate that the number of physical areas storing data in the storage medium 240 has increased by one. For example, the fragmentation frequency 424 stores the number of write operations each of which has caused fragmentation in each area on the LBA space until the total write amount of the SSD changes by a predetermined amount.

Note that the format of data stored in the fragmentation state management table 303 is not limited to that shown in FIG. 4. For example, the first LBA 421 of each entry can be omitted if the entries are arranged in the address order of the LBA space. Furthermore, with respect to the information included in each entry, for example, instead of storing a value directly indicating a frequency like the number of write operations per unit time, the fragmentation frequency 424 can be represented in a format like the total write amount of the whole SSD at the time of the last write operation that has caused fragmentation, similarly to the immediately preceding total write amount 423.

«Hardware Arrangement of Host Computer»

Figure 5:
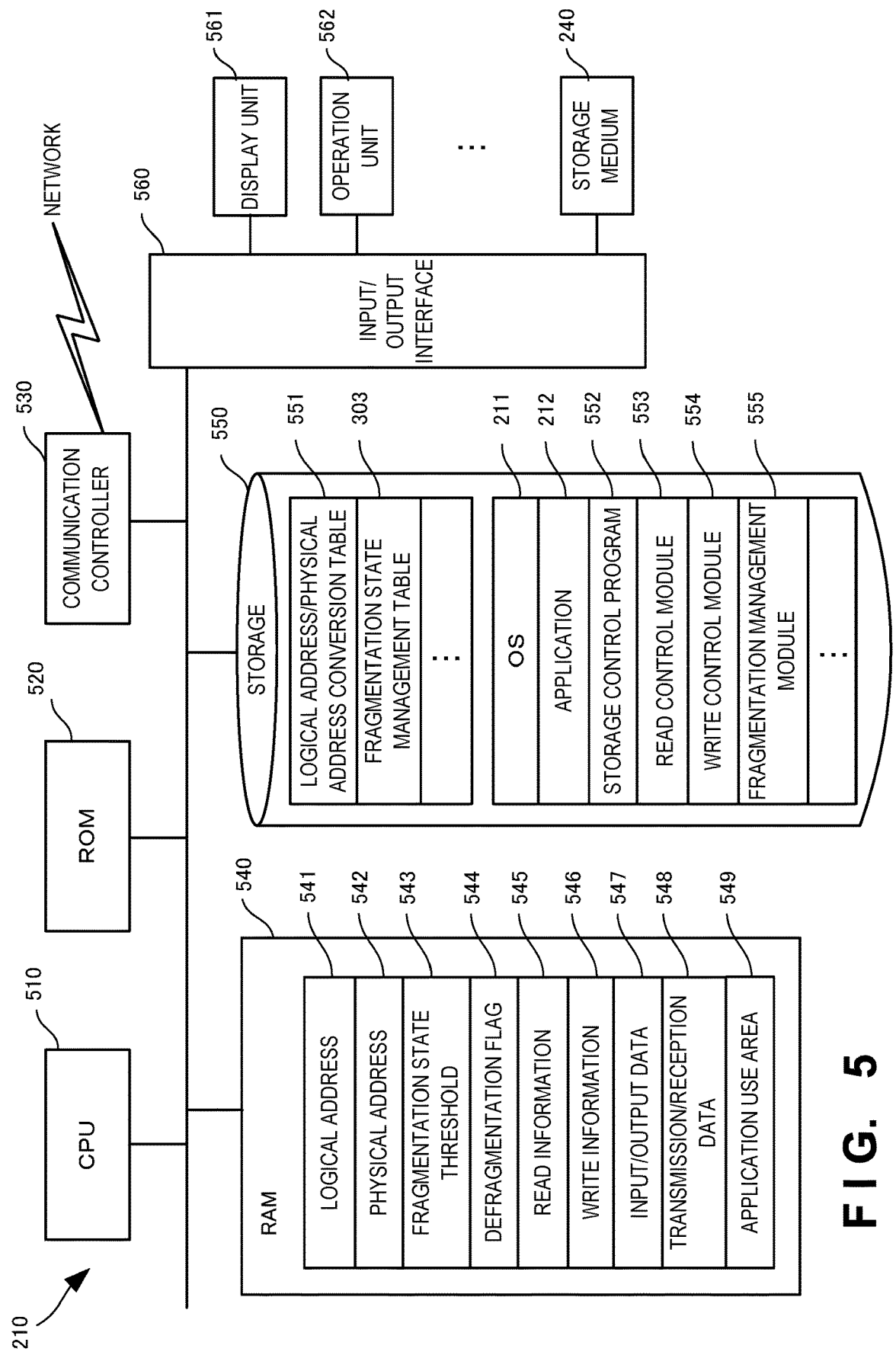
FIG. 5 is a block diagram showing the hardware arrangement of a host computer including a storage controller according to the second example embodiment of the present invention.

FIG. 5 is a block diagram showing the hardware arrangement of the host computer 210 including the storage controller 220 according to this example embodiment. Note that in FIG. 5, the storage controller 220 is shown as software processing of the host computer 210. However, the storage controller 220 may be implemented by a one-chip computer independent of the host computer 210.

Referring to FIG. 5, a CPU (Central Processing Unit) 510 is an arithmetic control processor, and implements the functional components of the storage controller 220 shown in FIG. 3 by executing a program. A ROM (Read Only Memory) 520 stores permanent data such as initial data and a program, and programs. A communication controller 530 communicates with the storage medium 240 via the network 250. Note that the number of CPUs 510 is not limited to one, and a plurality of CPUs or a GPU (Graphical Processing Unit) for image processing may be included. The communication controller 530 desirably includes a CPU independent of the CPU 510, and writes or reads transmission/reception data in or from the area of a RAM (Random Access Memory) 540. It is desirable to provide a DMAC (Direct Memory Access Controller) (not shown) for transferring data between the RAM 540 and a storage 550. Furthermore, an input/output interface 560 desirably includes a CPU independent of the CPU 510, and writes or reads input/output data in or from the area of the RAM 540. Therefore, the CPU 510 processes the data by recognizing that the data has been received by or transferred to the RAM 540. Furthermore, the CPU 510 prepares processing results in the RAM 540, and delegates succeeding transmission or transfer to the communication controller 530, DMAC, or input/output interface 560.

The RAM 540 is a random access memory used as a temporary storage work area by the CPU 510. An area to store data necessary for implementation of the example embodiment is allocated to the RAM 540. A logical address 541 is an address used to access the storage medium 240 from the OS 211 or application 212. A physical address 542 is an address converted from the logical address 541 and used to access the storage medium 240. A fragmentation state threshold 543 is a threshold for determining execution of rearrangement for defragmentation based on the fragment count 422 of the fragmentation state management table 303 representing the fragmentation state. A defragmentation flag 544 is a flag that indicates execution of rearrangement for defragmentation and is set when the fragment count 422 exceeds the fragmentation state threshold 543. Read information 545 is information read from the storage medium 240 based on a request from the OS 211 or application 212. Write information 546 is information written in the storage medium 240 based on a request from the OS 211 or application 212. Input/output data 547 is data input/output via the input/output interface 560. Transmission/reception data 548 is data transmitted/received via the communication controller 530. An application use area 549 is an area used by the application for processing other than storage control.

The storage 550 stores a database, various parameters, or the following data or programs necessary for implementation of the example embodiment. A logical address/physical address conversion table 551 is a table used to convert the logical address 541 requested to be accessed from the OS 211 or application 212 into the physical address 542 used to access the storage medium 240, and changes in accordance with the correspondence between the address spaces. The fragmentation state management table 303 is a table having the structure shown in FIG. 4. The storage 550 stores the following programs. The OS 211 is a basic program for controlling the whole host computer 210. The application 212 is a program currently executed by the host computer 210. The storage control program 552 is a program that implements access control according to this example embodiment when the storage medium 240 is accessed from the OS 211 or application 212. A read control module 553 is a module that controls read from the storage medium 240 in a storage control program 552. A write control module 554 is a module that controls write in the storage medium in the storage control program 552. A fragmentation management module 555 is a module that rearranges the memory areas at the physical addresses to cancel the fragmentation state by monitoring the fragmentation state.

The input/output interface 560 interfaces input/output data with an input/output device. The input/output interface 560 is connected to a display unit 561 and an operation unit 562. The input/output interface 560 may also be connected to the storage medium 240. Furthermore, a loudspeaker serving as a voice output unit, a microphone serving as a voice input unit, or a GPS position determiner may be connected.

Note that programs and data that are associated with the general-purpose functions of the host computer 210 and other feasible functions are not shown in the RAM 540 or the storage 550 of FIG. 5.

«Processing Procedure of Storage Controller»

Figure 6:
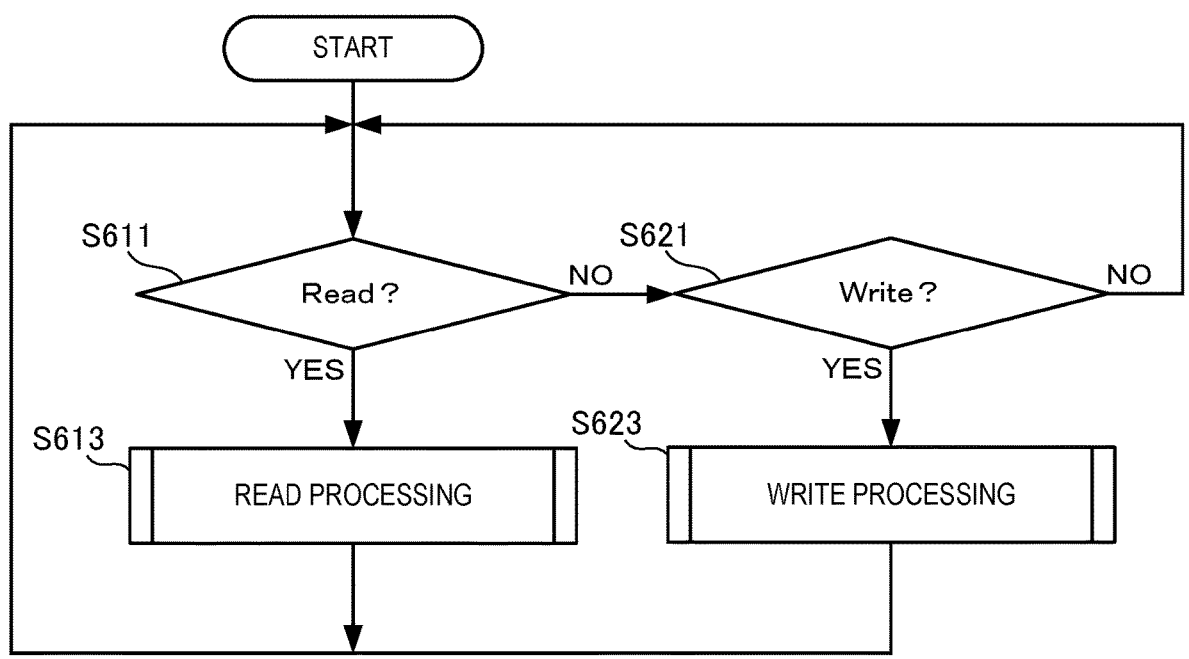
FIG. 6 is a flowchart illustrating the processing procedure of the storage controller according to the second example embodiment of the present invention.

FIG. 6 is a flowchart illustrating the processing procedure of the storage controller 220 according to this example embodiment. This flowchart is executed by the CPU 510 of FIG. 5 using the RAM 540, thereby implementing the functional components shown in FIG. 3.

In step S611, the storage controller 220 of the host computer 210 determines whether a read request has been received from the OS 211 or application 212. If a read request has been received, the storage controller 220 executes, in step S613, read processing from the storage medium 240; otherwise, the storage controller 220 determines in step S621 whether a write request has been received from the OS 211 or application 212. If a write request has been received, the storage controller 220 executes, in step S623, write processing in the storage medium 240.

(Read Processing)

Figure 7:
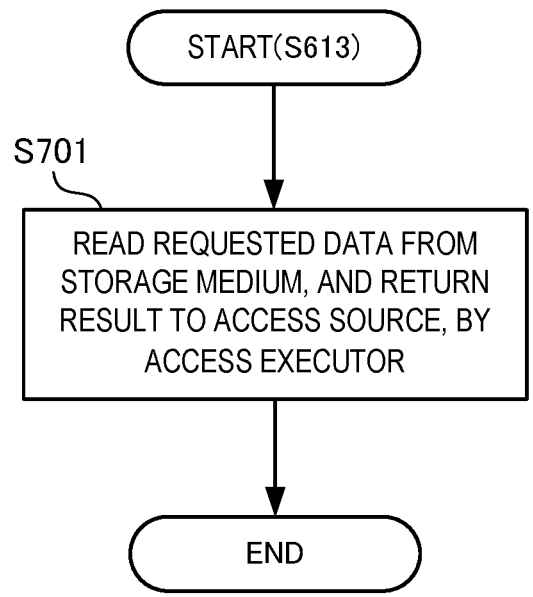
FIG. 7 is a flowchart illustrating the procedure of read processing according to the second example embodiment of the present invention.

FIG. 7 is a flowchart illustrating the procedure of read processing (step S613) according to this example embodiment. FIG. 7 shows a procedure of, in step S613 of FIG. 6, receiving a read request from the OS and returning requested data.

Upon receiving a read request from the software or OS operating on the host computer 210, the access executor 301 of the storage controller 220 reads data from a request destination address in the storage medium 240, and returns a result to the software or OS as an access source, thereby ending the process (step S701).

By executing the above processes in step S701, the operation of receiving a read request from the software or OS operating on the host computer 210 and returning requested data according to this example embodiment is completed.

(Write Processing)

Figure 8A:
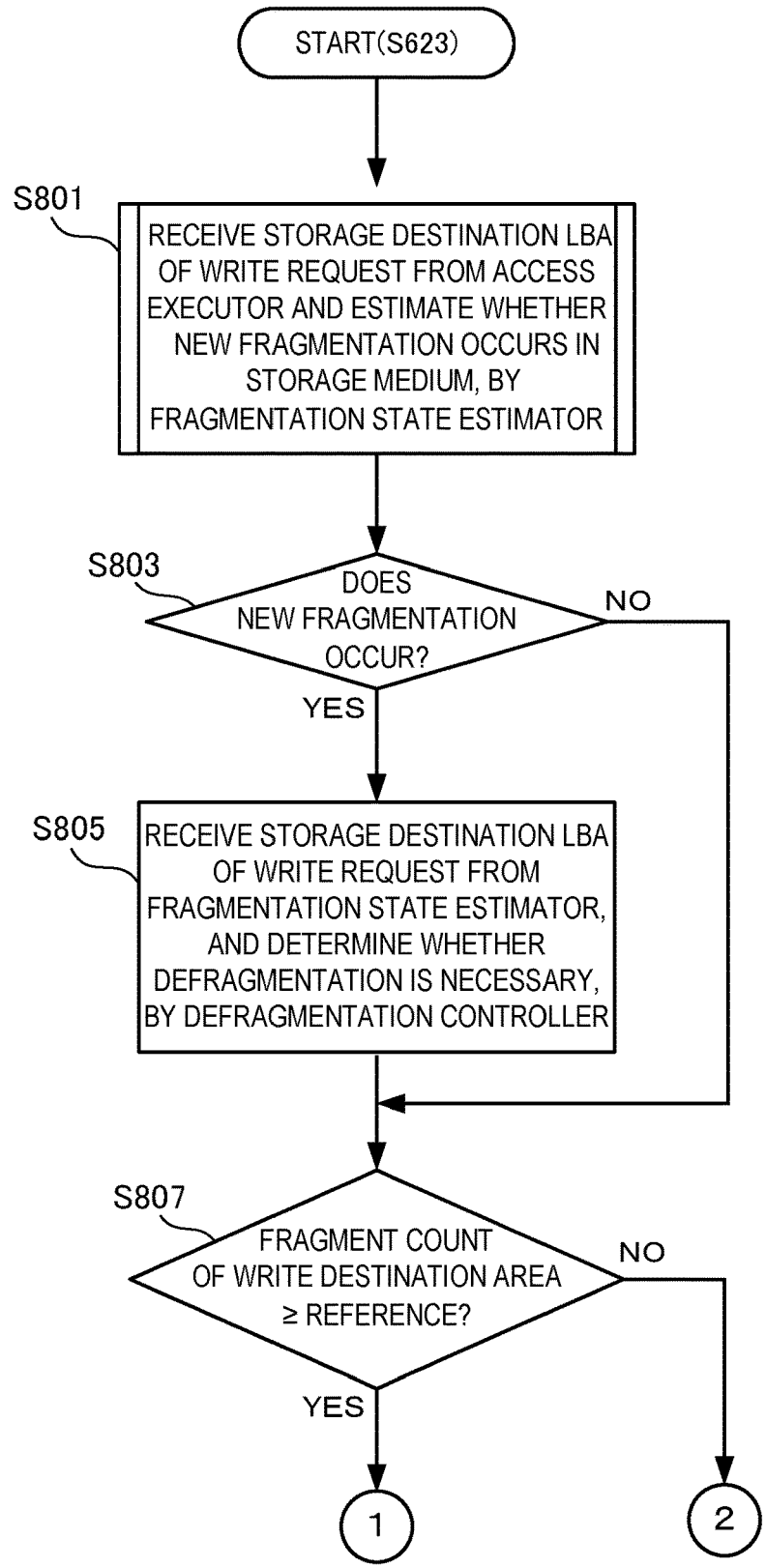
FIG. 8A is a flowchart illustrating the procedure of write processing according to the second example embodiment of the present invention.
Figure 8B:
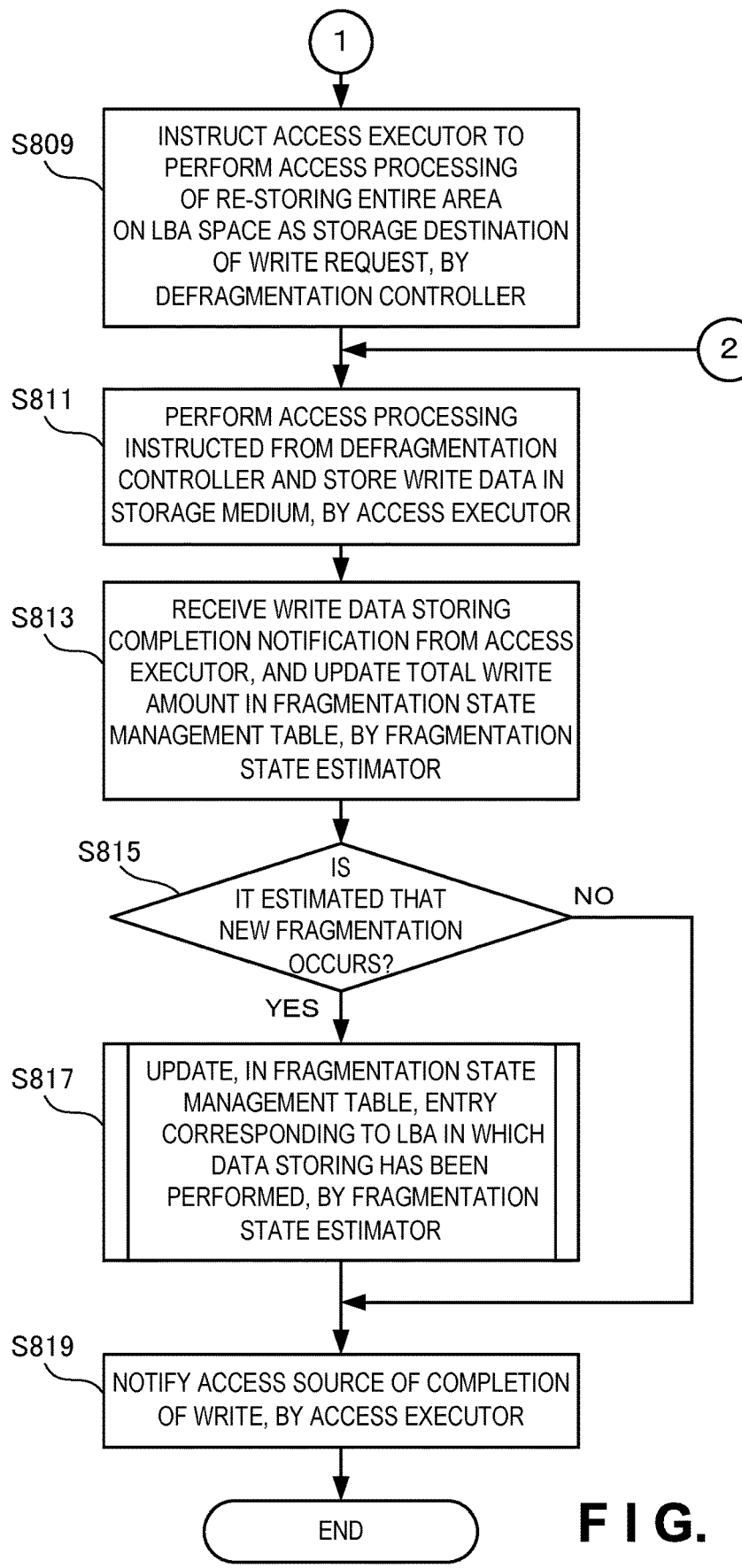
FIG. 8B is a flowchart illustrating the procedure of the write processing according to the second example embodiment of the present invention.

FIGS. 8A and 8B are flowcharts illustrating the procedure of the write processing (step S623) according to this example embodiment. FIGS. 8A and 8B show a procedure of, in step S623 of FIG. 6, receiving a write request from the OS and completing the write processing.

The access executor 301 of the storage controller 220 notifies the fragmentation state estimator 302 of the storage destination LBA of received write data. If the write data is stored in the LBA received from the access executor 301 in the storage medium 240, the fragmentation state estimator 302 estimates whether new fragmentation is caused in the storage medium 240 (step S801).

It is determined whether new fragmentation occurs (step S803). If it is determined that no new fragmentation occurs in the storage medium 240 by storing the write data (NO in step S803), processes in step S807 and subsequent steps are executed. On the other hand, if it is determined that new fragmentation occurs in the storage medium 240 by storing the write data (YES in step S803), the fragmentation state estimator 302 notifies the defragmentation controller 304 of the storage destination LBA of the write data in the storage medium 240. With respect to an area on the LBA space of the storage medium 240, that corresponds to the LBA received from the fragmentation state estimator 302, the defragmentation controller 304 determines whether defragmentation is necessary (step S805). More specifically, the fragment count 422 recorded in the entry corresponding to the first LBA 421 of the fragmentation state management table 303 is compared with a predetermined reference fragment count threshold for determining that defragmentation is necessary. If the fragment count 422 recorded in the entry is equal to or larger than the reference fragment count, it is determined that defragmentation is necessary.

It is determined whether defragmentation is necessary (step S807). If the fragment count 422 recorded in the corresponding entry of the fragmentation state management table 303 is smaller than the reference fragment count threshold (NO in step S807), processes in step S811 and subsequent steps of FIG. 8B are executed. If the fragment count 422 recorded in the corresponding entry of the fragmentation state management table 303 is equal to or larger than the reference fragment count threshold (YES in step S807), the defragmentation controller 304 instructs the access executor 301 to perform necessary read access and write access in addition to the write request for the storage medium 240 (step S809). More specifically, with respect to the area on the LBA space, the defragmentation controller 304 instructs the access executor 301 to read, from the storage medium 240, all data other than data updated by the write request. Furthermore, with respect to the area on the LBA space, the defragmentation controller 304 instructs the access executor 301 to create data of the entire area on the LBA space by combining the data instructed to be read and data updated by the write request, and write the created data at the same position on the LBA space in the storage medium 240 while controlling or restricting other write operations.

The fragmentation state estimator 302 notifies the access executor 301 of completion of the processing in the fragmentation state estimator 302. If the additional read access and write access instructed from the defragmentation controller 304 exist, the access executor 301 executes them to the storage medium 240. Furthermore, the access executor 301 stores the requested data in the storage medium 240 (step S811).

Upon completion of access instructed from the defragmentation controller 304 and storing the requested data with respect to the storage medium 240, the access executor 301 notifies the fragmentation state estimator 302 of the completion of the storage. The fragmentation state estimator 302 adds the total capacity of requested write data to which write access instructed by the defragmentation controller 304 has been performed in step S811 to the total write amount 410 of the storage medium 240 stored in the fragmentation state management table 303 (step S813).

It is determined whether new fragmentation occurs (step S815). If, as a result of estimating the fragmentation state by the fragmentation state estimator 302 in step S815, it is determined that no new fragmentation occurs due to the write request (NO in step S815), processes in step S819 and subsequent steps are executed. If, as a result of estimating the fragmentation state by the fragmentation state estimator 302 in step S815, it is determined that new fragmentation occurs due to the write request (YES in step S815), the fragmentation state estimator 302 performs processing of updating, in the fragmentation state management table 303, the entry corresponding to the LBA in which data storage has been performed (step S817).

The access executor 301 notifies the OS 211 or application 212 as the access source of the completion of the write request (step S819), thereby ending the process.

By executing the above processes in steps S801 to S819, the operation of receiving a write request from the OS 211 or application 212 operating on the storage controller 220 of the host computer 210 and completing the write request according to this example embodiment is completed.

(Fragmentation Determination Processing)

Figure 9A:
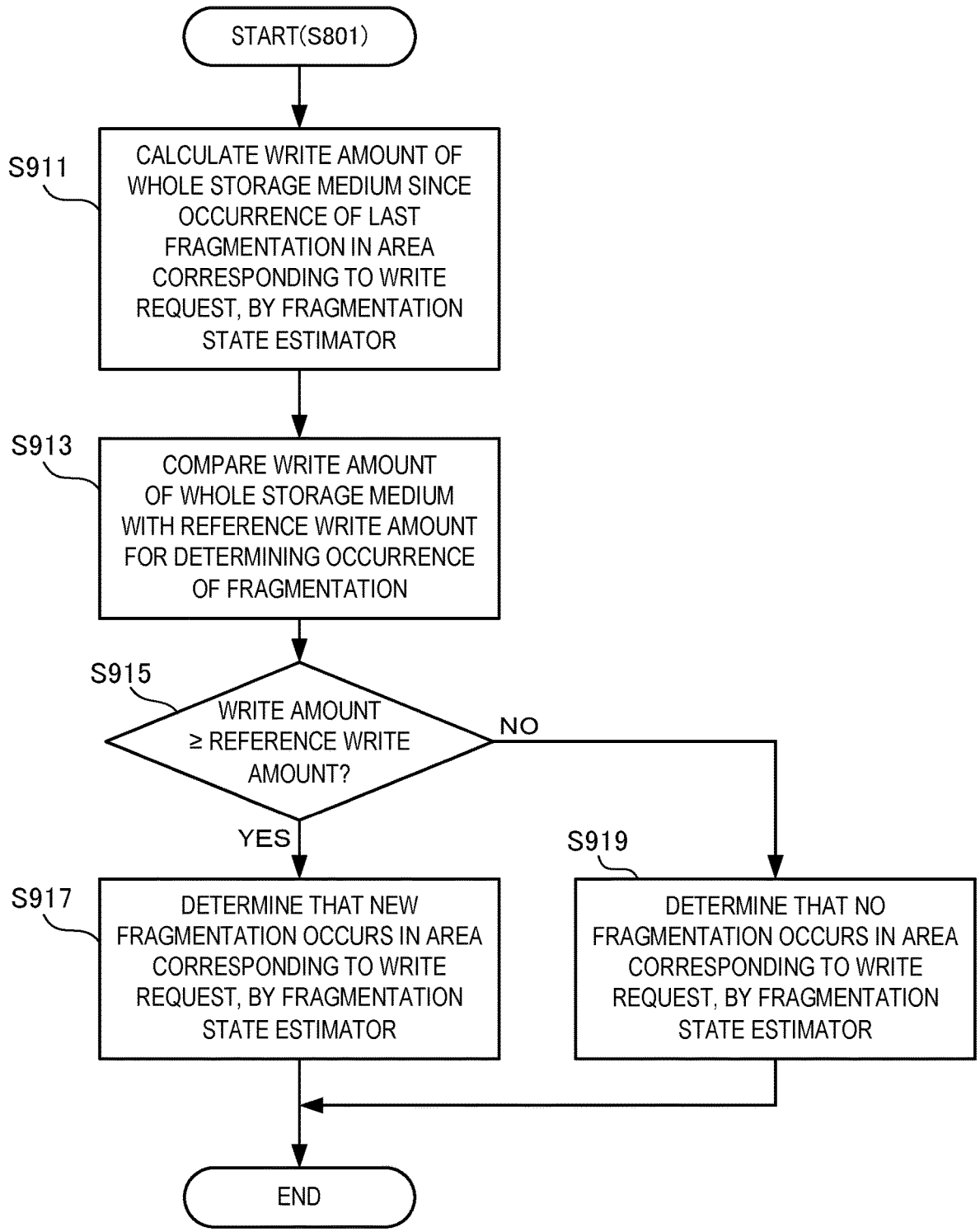
FIG. 9A is a flowchart illustrating the procedure of fragmentation determination processing according to the second example embodiment of the present invention.

FIG. 9A is a flowchart illustrating the procedure of the fragmentation determination processing (step S801) according to this example embodiment. FIG. 9A shows a procedure in which the fragmentation state estimator 302 estimates in step S801 of FIG. 8A whether fragmentation occurs in the storage medium 240 when the access executor 301 stores the data of the write request received from the host computer 210.

With reference to the fragmentation state management table 303, the fragmentation state estimator 302 of the storage controller 220 calculates a write amount of the storage medium 240 since the occurrence of last fragmentation in the area including the write request destination on the LBA space based on the difference between the total write amount 410 of the storage medium 240 and the immediately preceding total write amount 423 of the entry corresponding to the LBA of the write request destination (step S911).

The fragmentation state estimator 302 compares the write amount of the storage medium 240 since the occurrence of the last fragmentation, that has been obtained in step S911, with a predetermined reference write amount for determining the occurrence of fragmentation (step S913). If, for example, the storage medium 240 is an SSD and data is stored in a block of the NAND flash in a write-once manner, it is possible to determine the occurrence of data fragmentation in which data corresponding to the same area on the LBA space are stored in a plurality of blocks of the NAND flash, by setting the reference write amount to a value equal to or larger than the block size of the NAND flash.

The result of the comparison in step S913 is determined in step S915. If the write amount of the storage medium 240 since the occurrence of the last fragmentation is equal to or larger than the reference write amount (YES in step S915), the fragmentation state estimator 302 determines that fragmentation occurs in the area including the write request destination on the LBA space (step S917), thereby ending the process. If, as a result of the comparison in step S913, the write amount of the storage medium 240 since the occurrence of the last fragmentation is smaller than the reference write amount (NO in step S915), the fragmentation state estimator 302 determines that no fragmentation occurs in the area including the write request destination on the LBA space (step S919), thereby ending the process.

By executing the above processes in steps S911 to S919, the operation in which the fragmentation state estimator 302 estimates in step S801 whether fragmentation occurs in the storage medium 240 when the access executor 301 stores the data of the write request received from the OS 211 or application 212 of the host computer 210 is completed.

(Fragmentation Management Table Update Processing)

Figure 9B:
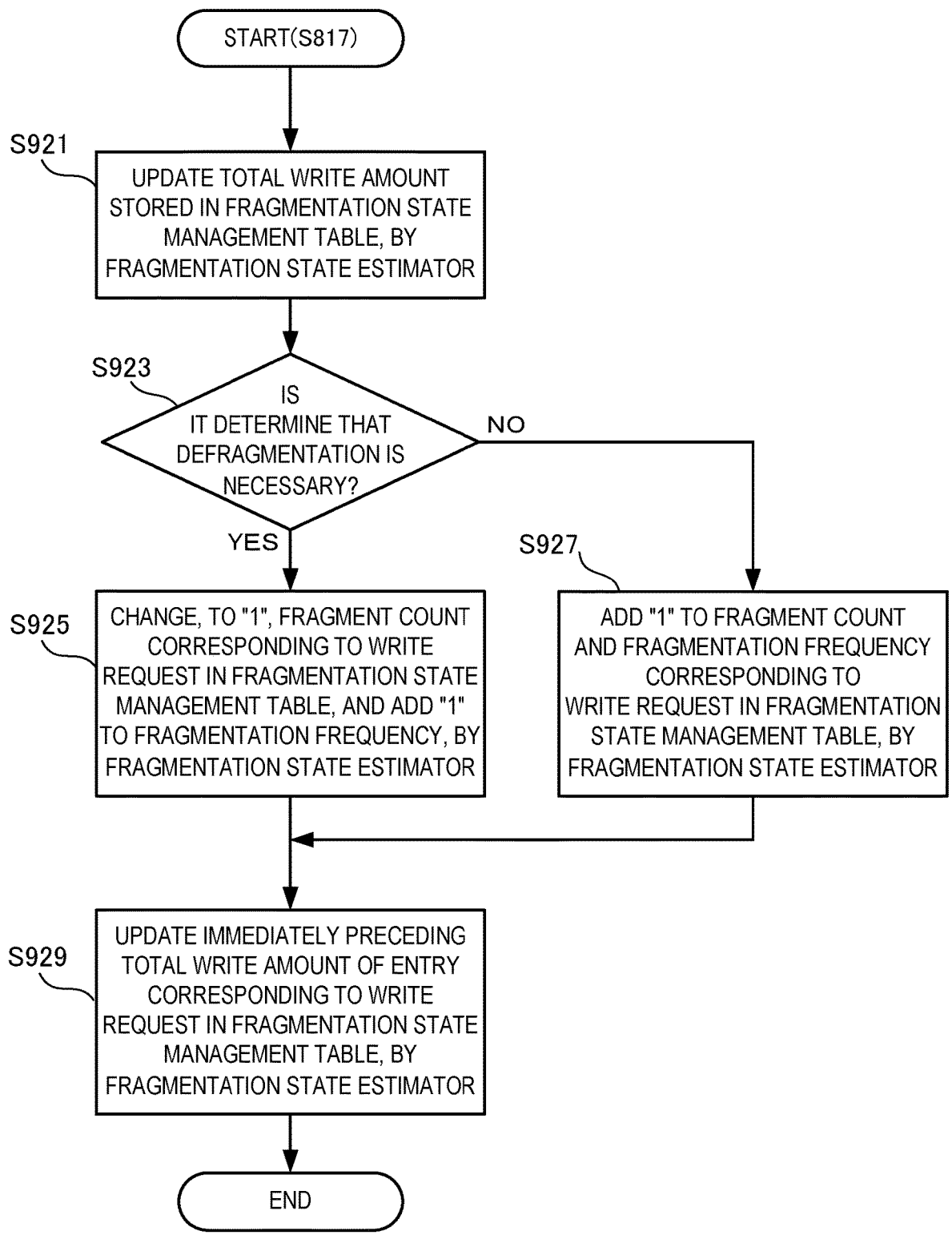
FIG. 9B is a flowchart illustrating the procedure of fragmentation management table update processing according to the second example embodiment of the present invention.

FIG. 9B is a flowchart illustrating the procedure of the fragmentation management table update processing (step S813) according to this example embodiment. FIG. 9B shows a procedure in which the fragmentation state estimator 302 updates the fragmentation state management table 303 in step S813 of FIG. 8B.

The fragmentation state estimator 302 updates the total write amount 410 stored in the fragmentation state management table 303 to a value obtained by adding, to the total write amount 410, the size of the write request received by the access executor 301 (step S921).

The fragmentation state estimator 302 determines whether it is determined that defragmentation is necessary (step S923). If the defragmentation controller 304 determines in step S807 that defragmentation of the area corresponding to the LBA of the write request destination received by the access executor 301 is necessary (YES in step S923), the fragmentation state estimator 302 sets the fragment count 422 to "1" for the entry corresponding to the area in the fragmentation state management table 303. In addition, "1" is added to the value of the fragmentation frequency 424 of the entry, and processes in step S929 and subsequent steps are executed (step S925). If the defragmentation controller 304 determines in step S807 that defragmentation of the area corresponding to the LBA of the write request destination received by the access executor 301 is unnecessary (NO in step S923), the fragmentation state estimator 302 adds "1" to the fragment count 422 of the entry corresponding to the area in the fragmentation state management table 303. In addition, "1" is added to the value of the fragmentation frequency 424 of the entry (step S927).

The fragmentation state estimator 302 updates the immediately preceding total write amount 423 of the entry, in the fragmentation state management table 303, whose fragment count 422 has been updated in step S925 or S927 to the same value as the total write amount 410 (step S929), thereby ending the process.

By executing the above processes in steps S921 to S929, the operation in which the fragmentation state estimator 302 updates the fragmentation state management table 303 in step S805 is completed. Note that the update order of the pieces of information stored in the fragmentation state management table 303 in the processes in steps S921 to S929 need not always be the order shown in FIG. 9B. For example, the processing in step S921 may be executed after or at the same time as the processes in steps S923 to S927.

According to this example embodiment, it is possible to improve the access performance of a storage medium and prolong the life of the storage medium by collecting the history of write processing amounts for respective areas, estimating an area having a high fragmentation occurrence frequency, and implementing defragmentation by rearranging the area estimated in advance to have a high fragmentation occurrence frequency.

That is, by applying the method according to this example embodiment, the load of the processing for saving valid data from a block to be collected in GC executed in the SSD for the memory area of the NAND flash is reduced, thereby improving the access performance of the SSD and prolonging the life of the SSD. Furthermore, the method according to this example embodiment is applicable regardless of a change in environment such as the execution statuses and combination of applications that access the SSD without changing the SSD and the access protocol for the SSD.

[Third Example Embodiment]

An information processing system including a storage control apparatus as a storage controller in a host computer according to the third example embodiment of the present invention will be described next. The information processing system according to this example embodiment is different from that according to the second example embodiment in that a buffer for replacing write processing in an area in which it is estimated that fragmentation is significant is provided. The remaining components and operations are the same as those in the second example embodiment. Hence, the same reference numerals denote the same components and operations, and a detailed description thereof will be omitted.

«Information Processing System»

Figure 10:
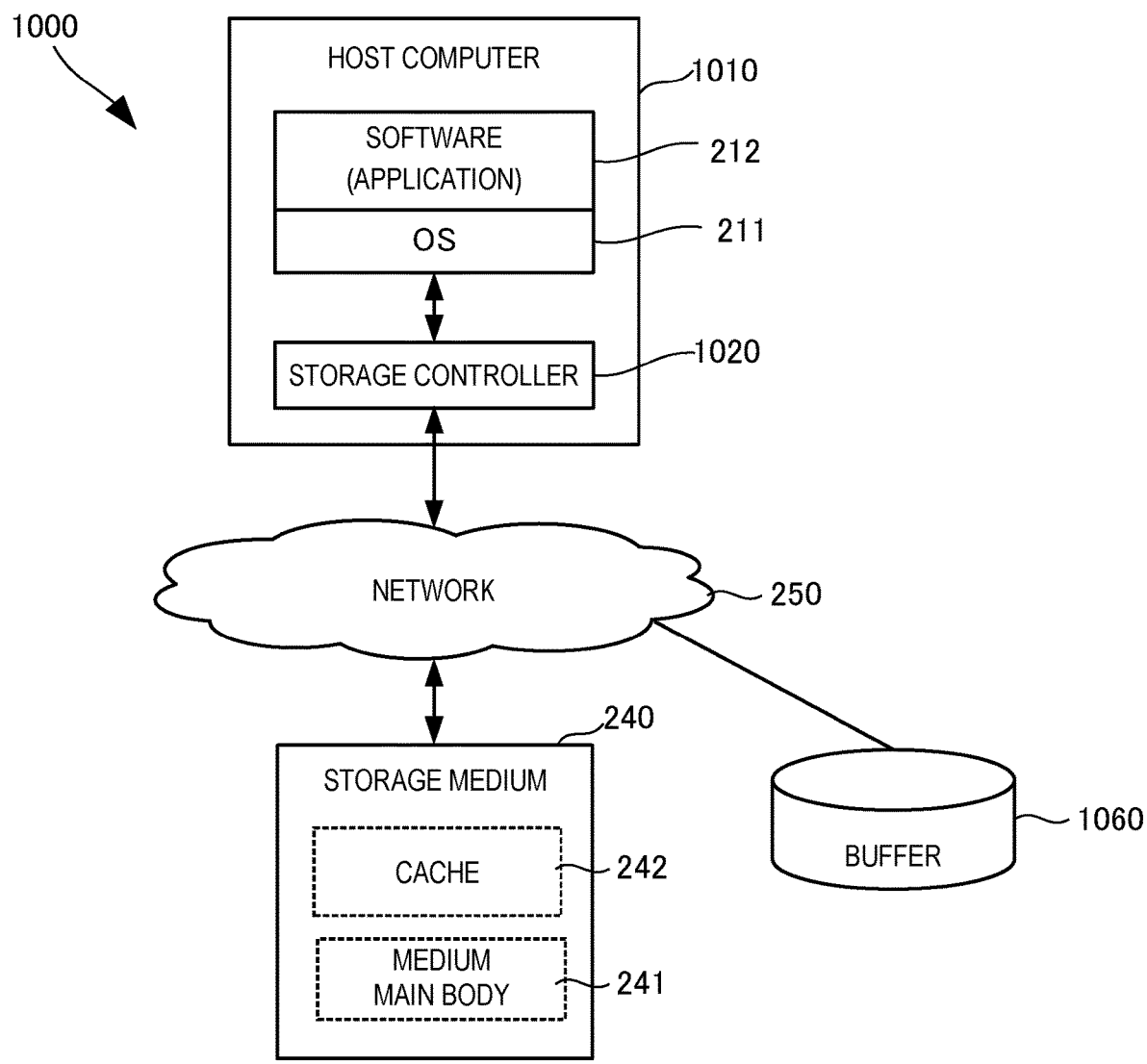
FIG. 10 is a view showing the arrangement of an information processing system according to the third example embodiment of the present invention.

FIG. 10 is a view showing the arrangement of an information processing system 1000 according to this example embodiment. Note that in FIG. 10, the same reference numerals as those in FIG. 3 denote the same functional components and a description thereof will be omitted.

The information processing system 1000 shown in FIG. 10 includes a buffer 1060. The buffer 1060 stores data corresponding to a write request for an area having a high fragmentation frequency among write data in a storage medium 240. Similarly to the storage medium 240, an SSD can be used as the buffer 1060, instead of using a storage medium such as a DRAM (Dynamic Random Access Memory) having performance higher than that of the storage medium 240. A partial area of the storage medium 240 may be assigned as the buffer 1060.

A host computer 1010 includes a storage controller 1020 that controls write processing in the storage medium 240 or the buffer 1060 in addition to the processing according to the second example embodiment.

«Functional Arrangement of Storage Control Apparatus»

Figure 11:
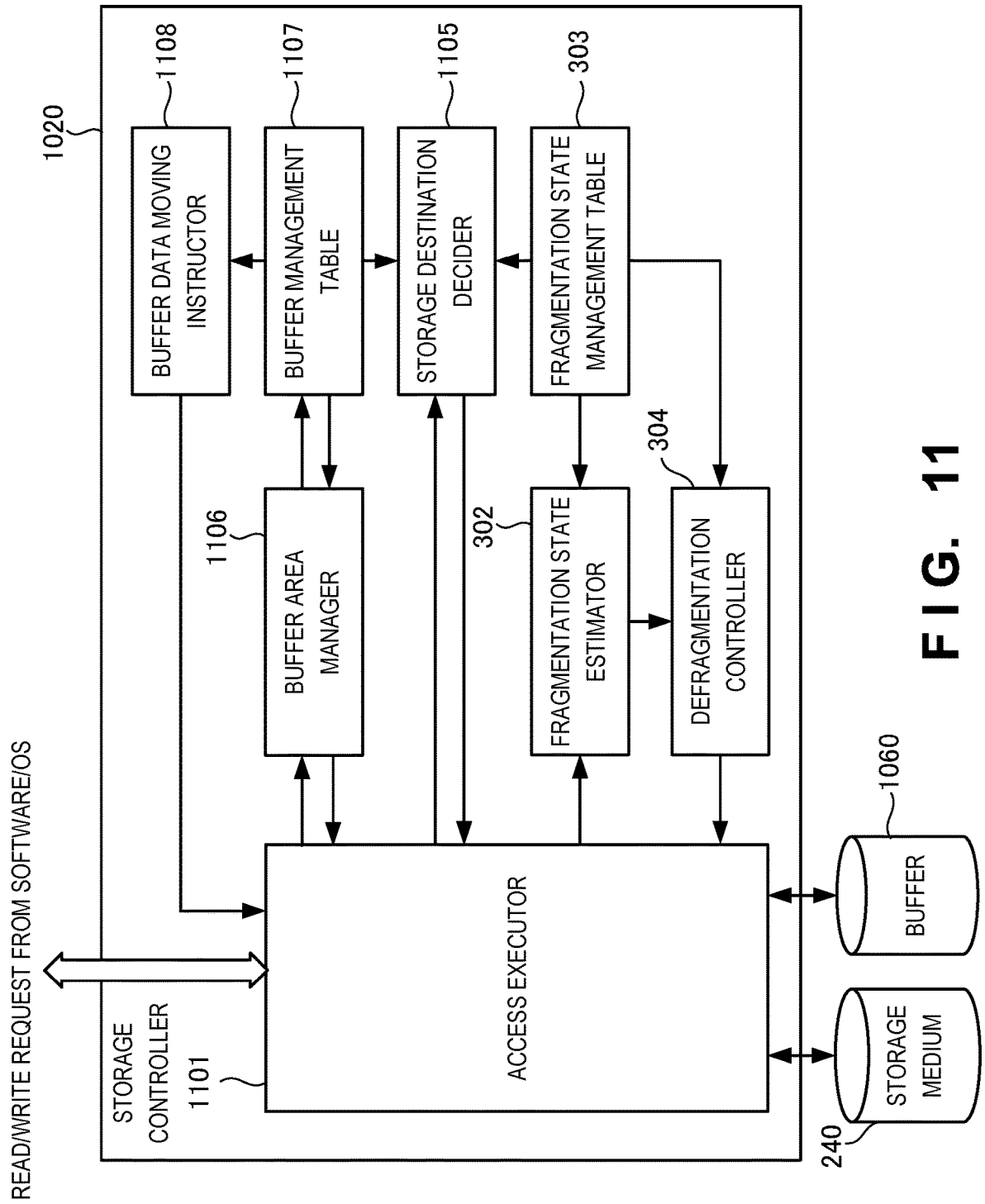
FIG. 11 is a block diagram showing the functional arrangement of a storage control apparatus according to the third example embodiment of the present invention.

FIG. 11 is a block diagram showing the functional arrangement of the storage controller 1020 serving as the storage control apparatus according to this example embodiment. Note that in FIG. 11, the same reference numerals as those in FIG. 3 denote the same functional components and a description thereof will be omitted.

Referring to FIG. 11, the storage controller 1020 of the host computer 1010 includes an access executor 1101, a storage destination decider 1105, a buffer area manager 1106, a buffer management table 1107, and a buffer data moving instructor 1108.

The access executor 1101 receives an access request from an OS 211 or application 212 operating on the host computer 1010, and performs necessary access processing for the storage medium 240 and/or the buffer 1060. The access executor 1101 also performs processing of storing, in the storage medium 240, data overflowing from the buffer 1060, and processing of reading data from an area, instructed by a defragmentation controller 304, on the storage medium 240, and re-storing it. Note that data can be read from the area on the storage medium 240 by requesting a cache 242 of the storage medium 240, instead of directly requesting a medium main body 241 of the storage medium 240.

The storage destination decider 1105 decides the storage medium 240 or the buffer 1060 as the storage destination of data of each write request received by the access executor 1101 from the OS 211 or application 212. The storage destination decider 1105 acquires a fragmentation frequency 424 from a fragmentation state management table 303. The storage destination decider 1105 acquires the free capacity of the buffer with reference to the buffer management table 1107. If the fragmentation occurrence frequency of an area on the LBA space corresponding to the received write request is equal to or higher than a predetermined frequency and the buffer 1060 has a free capacity enough to store write data, the storage destination decider 1105 designates the buffer 1060 as the storage destination of the write data for the access executor 1101. Otherwise, the storage destination decider 1105 designates the storage medium 240 as the storage destination.

The buffer area manager 1106 searches whether data as the target of a read request received by the access executor 1101 is stored in the buffer 1060. If the data is stored, a storage destination address is instructed; otherwise, a response indicating that there is no request target data is returned. In addition, the buffer area manager 1106 designates a storage destination address on the buffer 1060 for the write data to be stored in the buffer 1060 by the access executor 1101, and updates the buffer management table 1107.

The buffer management table 1107 records, for each data stored in the buffer 1060, the correspondence between a storage destination LBA on the storage medium 240 and a storage destination address on the buffer 1060. Furthermore, the buffer management table 1107 manages an area in which data can be newly stored in the buffer 1060 and a free capacity.

The buffer data moving instructor 1108 acquires the free capacity with reference to the buffer management table 1107. If the free capacity is equal to or smaller than a predetermined capacity, the buffer data moving instructor 1108 decides data to be moved to the storage medium 240 from the data stored in the buffer 1060. The buffer data moving instructor 1108 instructs the access executor 1101 to move the data from the buffer 1060 to the storage medium 240. For example, the buffer data moving instructor 1108 compares fragmentation occurrence frequencies of the respective data stored in the buffer 1060 with reference to the fragmentation state management table 303, and selects, as data to be moved, data having the lowest fragmentation occurrence frequency. Alternatively, similarly to the general cache or buffer, data to be moved may be decided using an algorithm such as FIFO (First-In First-Out) or LRU (Least Recently Used).

(Buffer Management Table)

Figure 12:
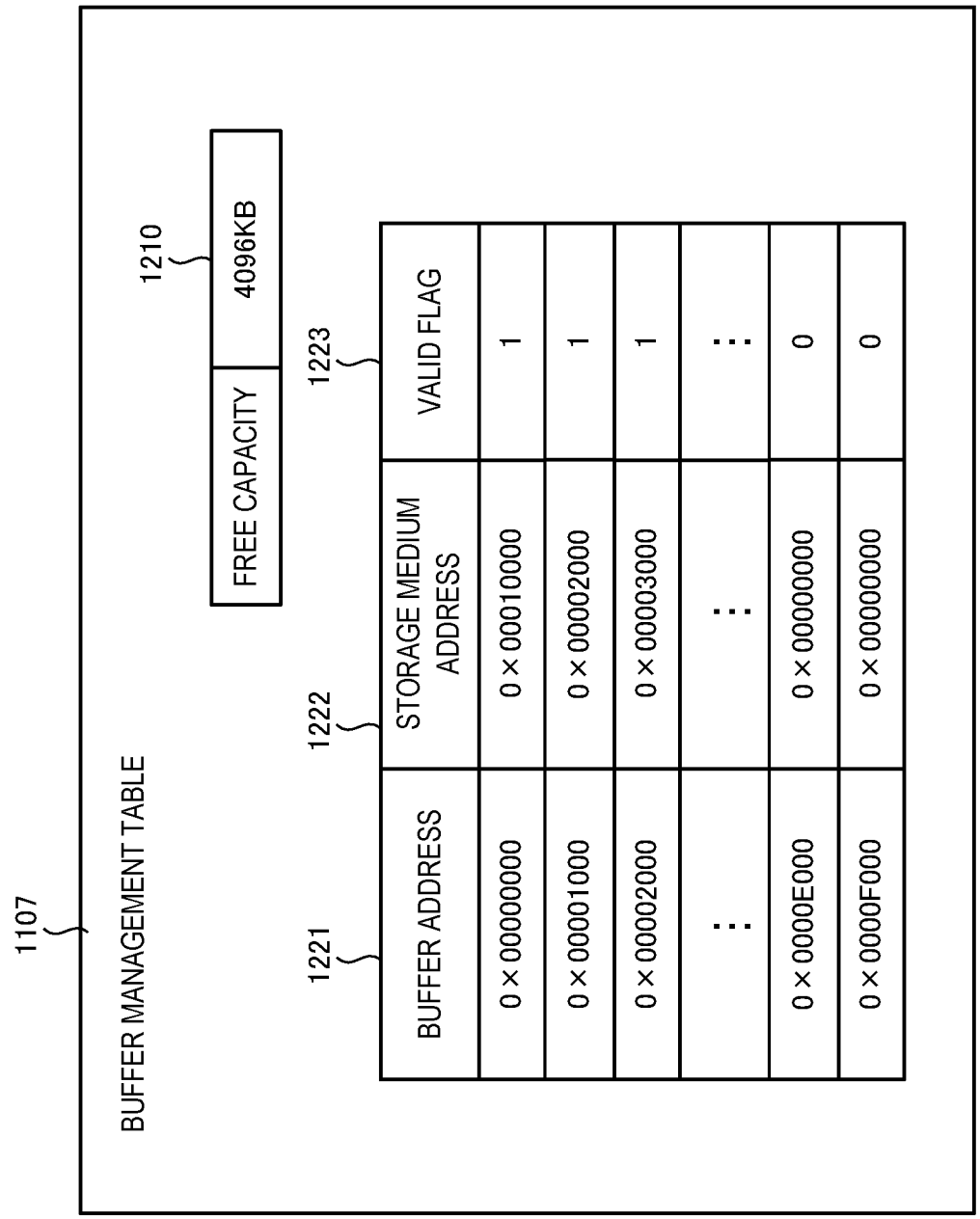
FIG. 12 is a view showing the structure of a buffer management table according to the third example embodiment of the present invention.

FIG. 12 is a view showing the arrangement of a buffer management table 1107 according to this example embodiment. The buffer management table 1107 is used by the buffer data moving instructor 1108 to decide data to be moved to the storage medium 240 from the data stored in the buffer 1060.

The buffer management table 1107 stores a free capacity 1210 of the whole buffer 1060, a buffer address 1221, a storage medium address 1222, and a valid flag 1223. The buffer address 1221 indicates a memory area on the buffer 1060. The storage medium address 1222 indicates a storage destination on the storage medium 240 for each data stored in the buffer 1060. The valid flag 1223 indicates whether the memory area on the buffer 1060 corresponding to the buffer address 1221 has been used.

Note that the format of data stored in the buffer management table 1107 is not limited to that shown in FIG. 12. For example, when a case in which the storage medium address 1222 is set to a specific value that does not exist on the LBA space of the storage medium 240 is defined as a state in which new data can be stored at the buffer address 1221, the valid flag 1223 can be omitted. To improve the search performance of the data stored in the buffer 1060, for example, a data structure such as a hash table may be used.

«Hardware Arrangement of Storage Controller»

The hardware arrangement of the storage controller 1020 according to this example embodiment is obtained by adding, to the hardware arrangement shown in FIG. 5, an arrangement of selecting the buffer 1060 and the storage medium, an arrangement of managing the buffer 1060, and an arrangement of controlling data movement from the buffer 1060 to the storage medium 240. For example, the buffer management table 1107 is stored in the storage.

«Processing Procedure of Storage Controller»

Figure 13:
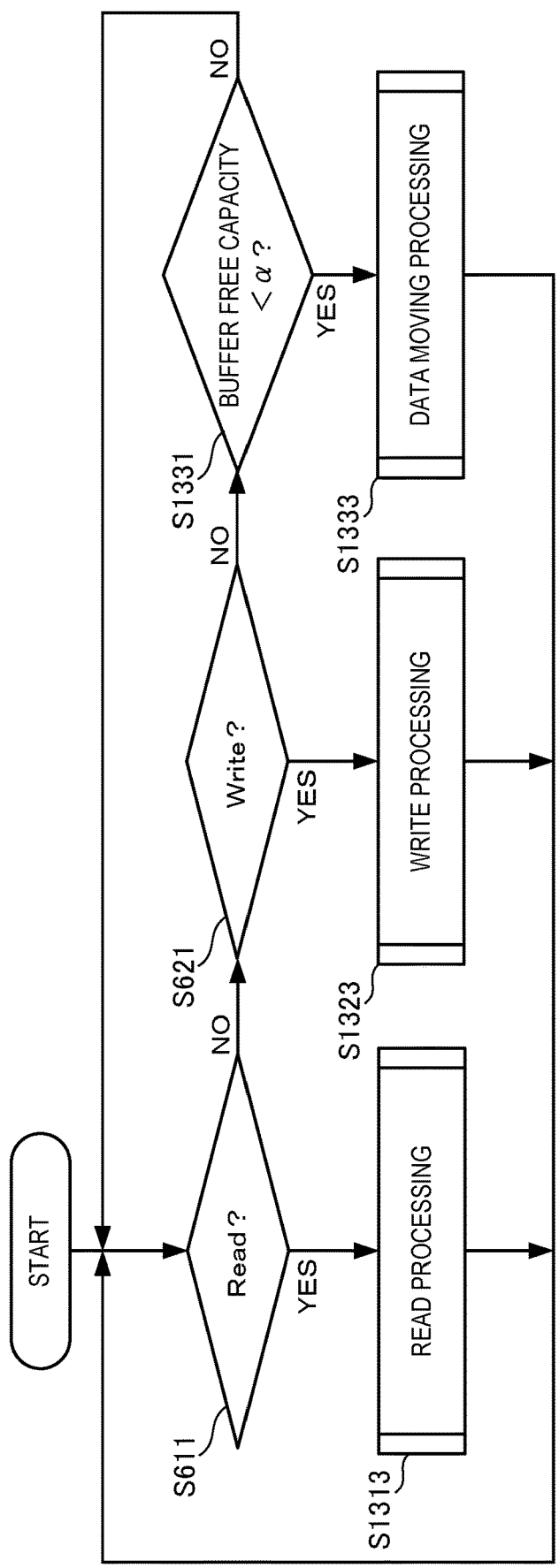
FIG. 13 is a flowchart illustrating the processing procedure of a storage controller according to the third example embodiment of the present invention.

FIG. 13 is a flowchart illustrating the processing procedure of the storage controller 1020 according to this example embodiment. This flowchart is executed by a CPU 510 of FIG. 5 using a RAM 540, thereby implementing the functional components shown in FIG. 11. Note that in FIG. 13, the same step numbers as those in FIG. 6 denote the same steps and a description thereof will be omitted.

If read processing is determined, the storage controller 1020 executes the read processing in step S1313. If write processing is determined, the storage controller 1020 executes the write processing in step S1323.

In step S1331, the storage controller 1020 determines whether the buffer free capacity is smaller than a threshold α. If the buffer free capacity is smaller than the threshold α, the storage controller 1020 executes, in step S1333, data moving processing from the buffer 1060 to the storage medium 240, thereby increasing the buffer free capacity.

(Read Processing)

Figure 14:
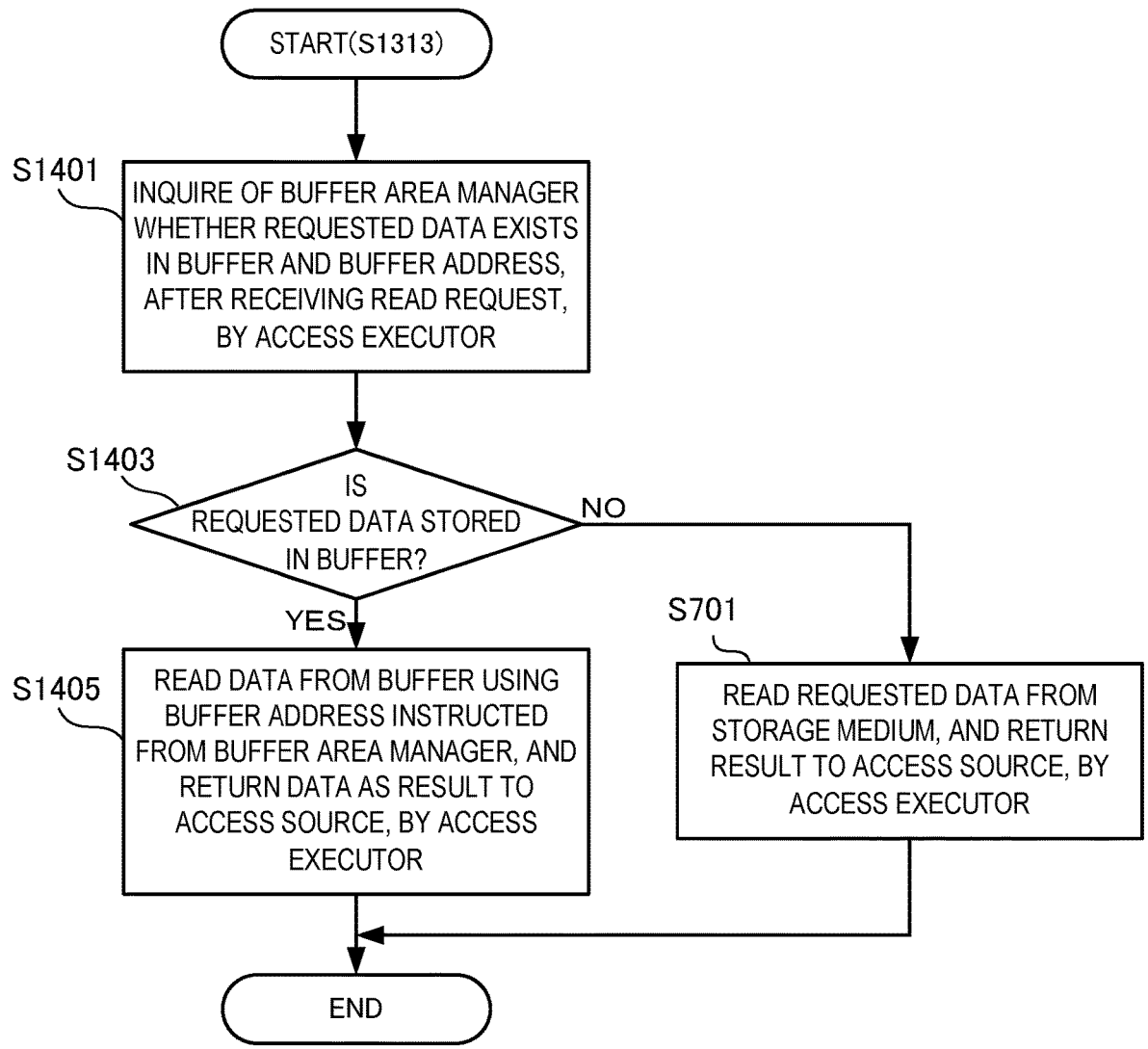
FIG. 14 is a flowchart illustrating the procedure of read processing according to the third example embodiment of the present invention.

FIG. 14 is a flowchart illustrating the procedure of read processing (step S1313) according to this example embodiment. Note that in FIG. 14, the same step numbers as those in FIG. 7 denote the same steps and a description thereof will be omitted.

Upon receiving a read request from the OS 211 or application 212 operating on the host computer 1010, the access executor 1101 of the storage controller 1020 inquires of the buffer area manager 1106 whether requested data is stored in the buffer 1060 and about a storage destination address in the buffer 1060 (step S1401).

A response from the buffer area manager 1106 is determined (step S1403). If the requested data is stored in the buffer 1060 (YES in step S1403), the access executor 1101 reads the data from the buffer 1060 using the address instructed from the buffer area manager 1106. A read result is returned to the OS 211 or application 212 as an access source (step S1405), thereby ending the process.

If no requested data is stored in the buffer 1060 (NO in step S1403), the access executor 1101 reads data from a request destination address in the storage medium 240, and returns a read result to the OS 211 or application 212 as an access source (step S701), thereby ending the process.

By executing the above processes in steps S1401 to S1405 and S701, the operation of receiving a read request from the OS 211 or application 212 operating on the host computer 1010 and returning requested data according to this example embodiment is completed.

(Write Processing)

Figure 15A:
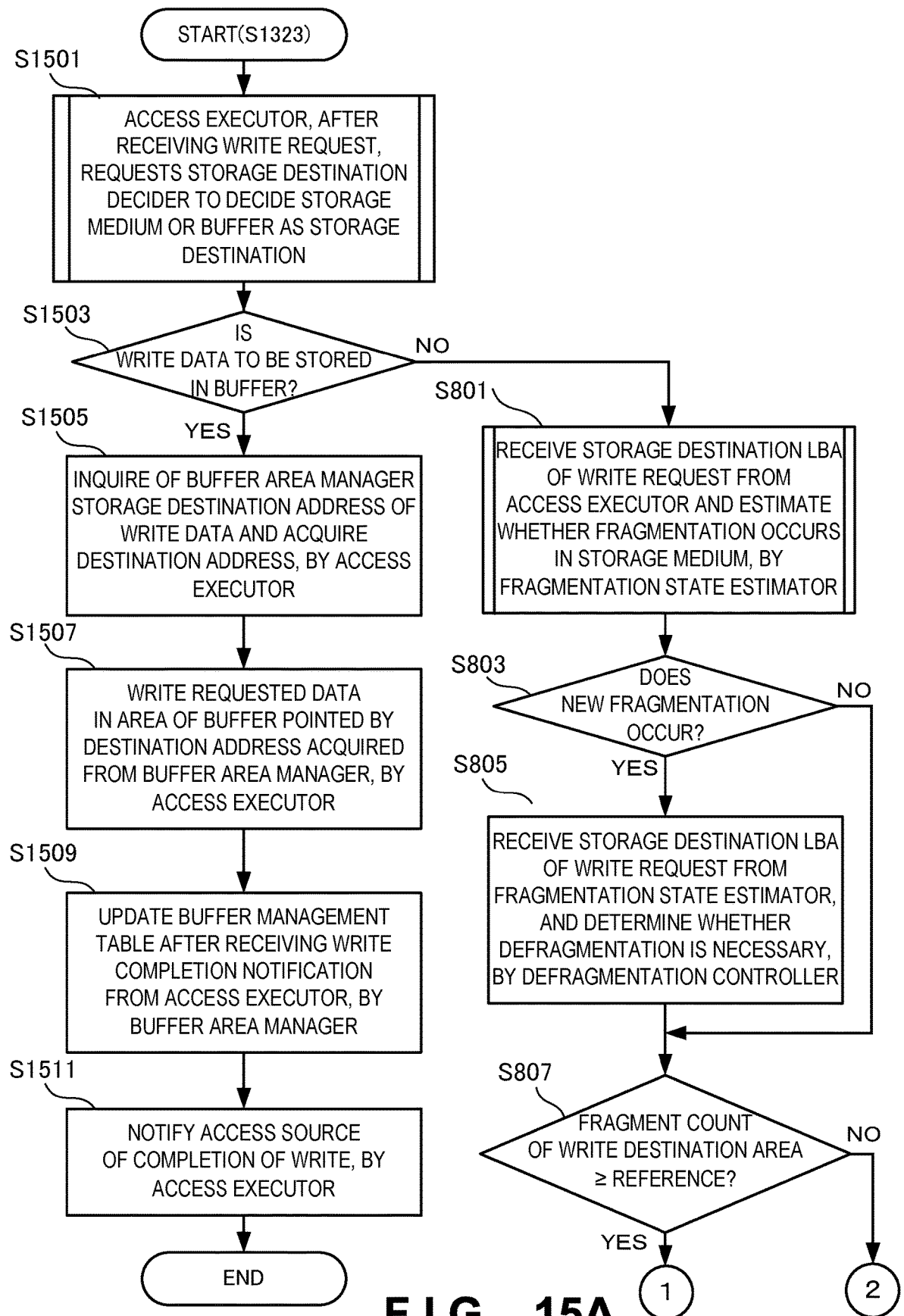
FIG. 15A is a flowchart illustrating the procedure of write processing according to the third example embodiment of the present invention.
Figure 15B:
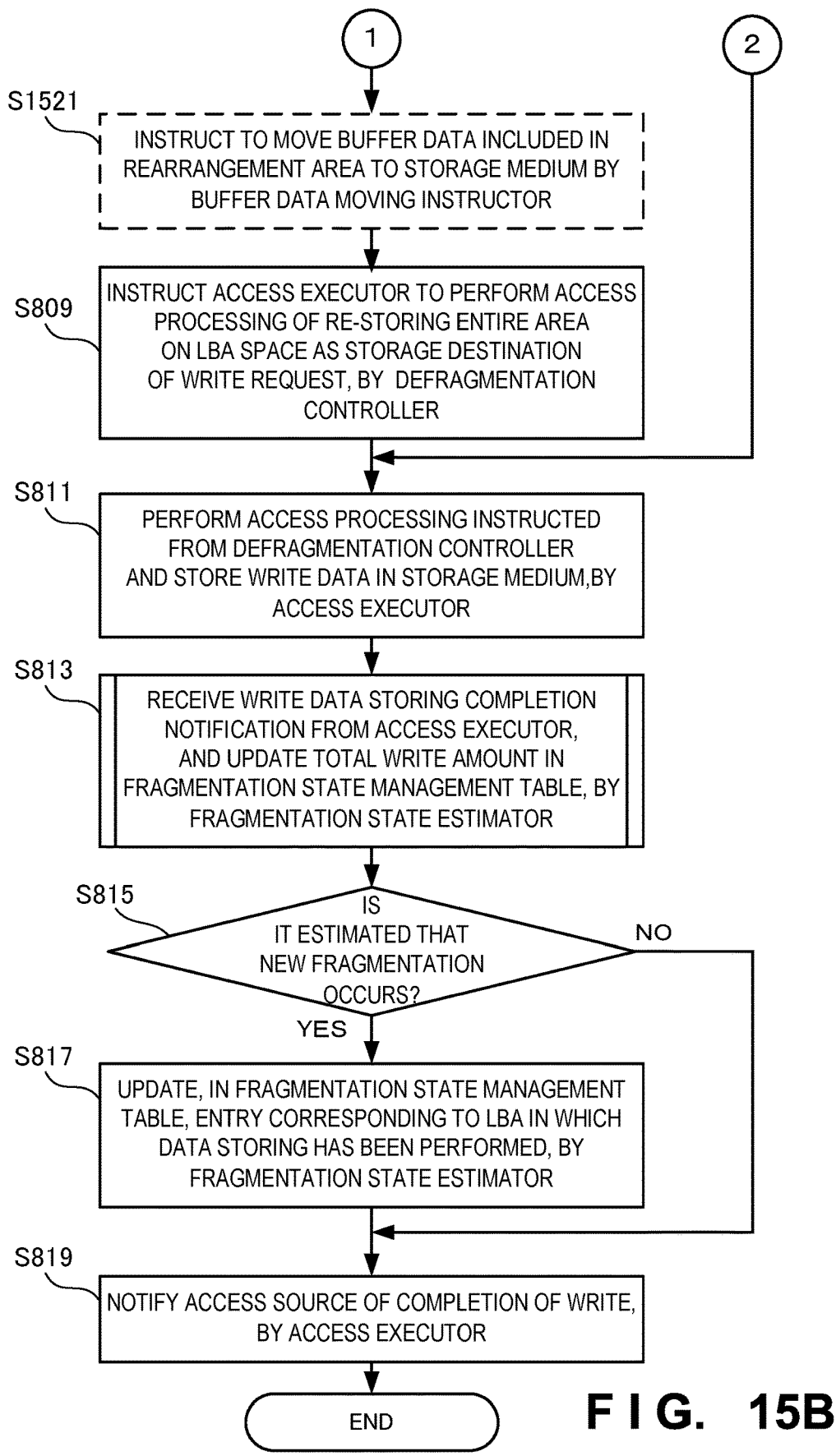
FIG. 15B is a flowchart illustrating the procedure of the write processing according to the third example embodiment of the present invention.

FIGS. 15A and 15B are flowcharts illustrating the procedure of the write processing (step S1323) according to this example embodiment. Note that in FIGS. 15A and 15B, the same step numbers as those in FIGS. 8A and 8B denote the same steps and a description thereof will be omitted.

Upon receiving a write request from the OS 211 or application 212 operating on the host computer 1010, the access executor 1101 of the storage controller 1020 instructs the storage destination decider 1105 to decide the storage medium 240 or the buffer 1060 as the storage destination of the write request (step S1501).

It is determined whether data is to be stored in the storage medium 240 or the buffer 1060 (step S1503). If, as a result of the processing in step S1501, the data of the write request received from the OS 211 or application 212 is stored in the storage medium 240 (NO in step S1503), processes in step S801 and subsequent steps are executed.

On the other hand, if, as a result of the processing in step S1503, the data of the write request received from the OS 211 or application 212 is stored in the buffer 1060 (YES in step S1503), the access executor 1101 inquires of the buffer area manager 1106 about the storage destination address of the write data. The buffer area manager 1106 decides the address in the buffer 1060 as the storage destination of the write data, and instructs the access executor 1101 of it (step S1505). The access executor 1101 stores the data of the write request from the OS 211 or application 212 at the address in the buffer 1060 instructed from the buffer area manager 1106 (step S1507).

Upon completion of storing the data in the buffer 1060, the access executor 1101 notifies the buffer area manager 1106 of the completion of storage. The buffer area manager 1106 receives the completion notification, and updates the storage medium address 1222 of an entry corresponding to the buffer address 1221 as a new data storage destination in the buffer management table 1107. If the valid flag 1223 of the entry is in an invalid state, it is changed to a valid state, and the free capacity 1210 is updated (step S1509). The access executor 1101 notifies the OS 211 or application 212 as an access source of the completion of the write request (step S1511), thereby ending the process.

The write processing including fragmentation estimation processing and defragmentation processing for the storage medium 240 in step S801 and subsequent steps is basically the same as that in FIGS. 8A and 8B. However, as an option, if it is determined in step S807 to execute the defragmentation processing for the storage medium 240 (YES in step S807), the buffer data moving instructor 1108 instructs, in step S1521, to move the buffer data included in an rearrangement area to the storage medium 240. As described above, an access delay and access count by defragmentation processing and buffer release processing are reduced by synchronizing the buffer release processing for the same memory area with execution of the defragmentation processing, thereby making it possible to improve the access performance of the storage medium and prolong the life of the storage medium.

By executing the above processes in steps S801 to S819, S1501 to S1511, and S1521, the operation of receiving a write request from the OS 211 or application 212 operating on the host computer 1010 and completing the write request according to this example embodiment is completed.

(Storage Destination Decision Processing)

FIG. 16 is a flowchart illustrating the procedure of the storage destination decision processing (step S1501) according to this example embodiment. FIG. 16 shows a procedure in which the storage destination decider 1105 decides, in step S1501 of FIG. 15A, the storage medium 240 or the buffer 1060 as the storage destination of the write request.

The storage destination decider 1105 of the storage controller 1020 acquires, from the fragmentation state management table 303, the fragmentation occurrence frequency of a physical area, as a write destination requested by the access executor 1101, in the storage medium (step S1601). The storage destination decider 1105 determines whether the acquired fragmentation occurrence frequency exceeds a threshold β (step S1603).

If the fragmentation occurrence frequency exceeds the threshold β (YES in step S1603), the storage destination decider 1105 acquires the free capacity 1210 of the buffer 1060 from the buffer management table 1107 (step S1605). The storage destination decider 1105 determines whether the acquired free capacity is enough to store the data of the write processing (step S1607). If the free capacity of the buffer 1060 is enough (YES in step S1607), the storage destination decider 1105 instructs the access executor 1101 to store the data in the buffer 1060 (step S1609).

If the fragmentation occurrence frequency does not exceed the threshold β (NO in step S1603) or the free capacity of the buffer 1060 is not enough (NO in step S1607), the storage destination decider 1105 instructs the access executor 1101 to store the data in the storage medium 240 (step S1611).

By executing the above processes in steps S1601 to S1611, the operation of receiving a write request from the OS 211 or application 212 and determining the buffer 1060 or the storage medium 240 as a storage destination according to this example embodiment is completed.

(Buffer Release Processing)

Figure 17:
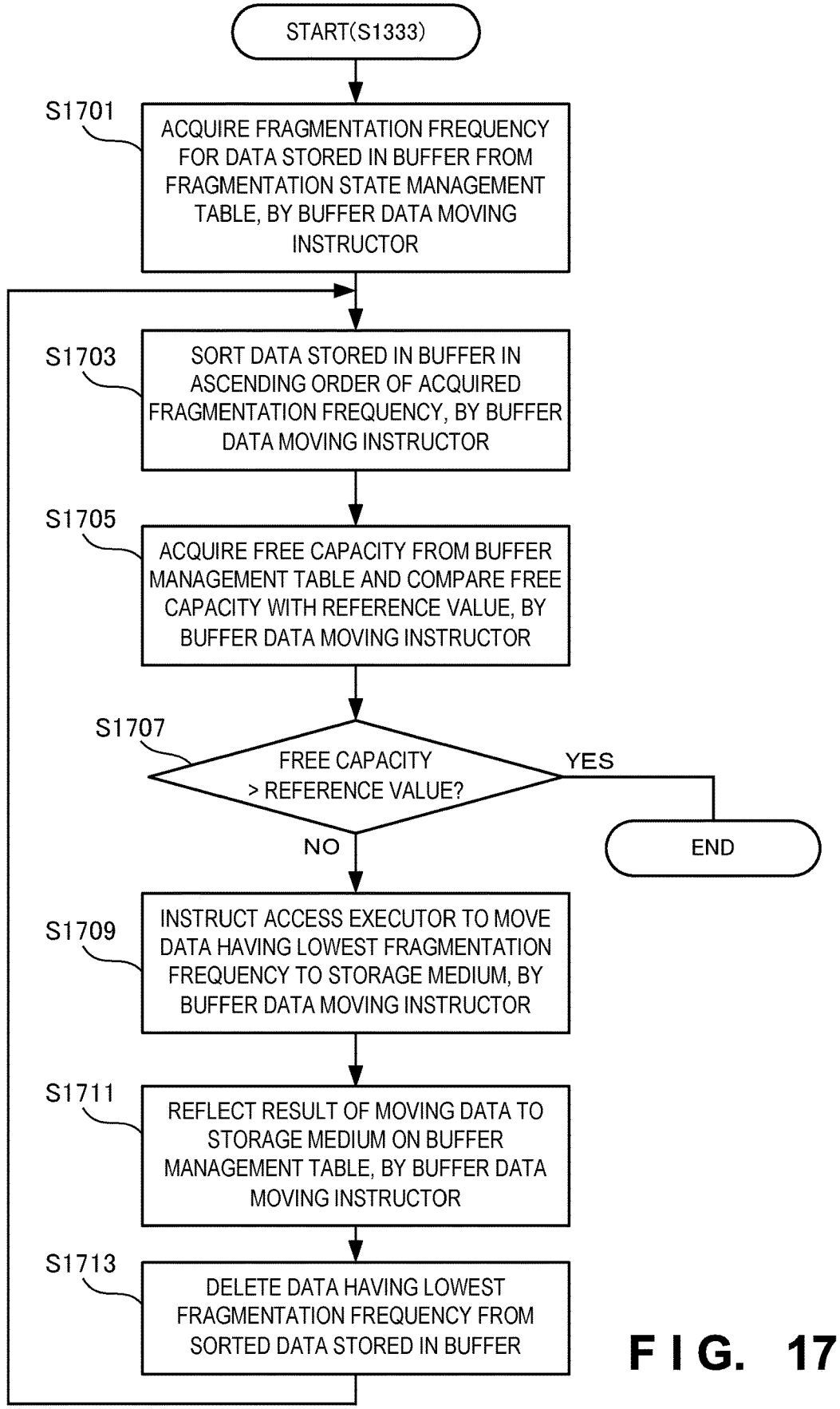
FIG. 17 is a flowchart illustrating the procedure of buffer release processing according to the third example embodiment of the present invention.

FIG. 17 is a flowchart illustrating the procedure of the buffer release processing (step S1333) according to this example embodiment. FIG. 17 shows a procedure in which the buffer data moving instructor 1108 moves the data stored in the buffer 1060 to the storage medium 240 to resolve a shortage of the free capacity of the buffer 1060.

The buffer data moving instructor 1108 of the storage controller 1020 lists the data stored in the buffer 1060 with reference to the buffer management table 1107. The buffer data moving instructor 1108 acquires the fragmentation frequency 424 for each data stored in the buffer 1060 with reference to the fragmentation state management table 303 (step S1701). The buffer data moving instructor 1108 sorts the respective data stored in the buffer 1060 in ascending order of the fragmentation frequency 424 acquired in step S1701 (step S1703).

The buffer data moving instructor 1108 acquires the free capacity 1210 of the buffer 1060 with reference to the buffer management table 1107. The buffer data moving instructor 1108 compares the acquired value of the free capacity of the buffer 1060 with a predetermined reference value of the free capacity as a condition for performing data moving processing from the buffer 1060 to the storage medium 240 (step S1705). If a comparison result is determined (step S1707) and the free capacity is larger than the reference value (YES in step S1707), the buffer data moving instructor 1108 ends the processing of instructing to move the data stored in the buffer 1060.

If the free capacity is equal to or smaller than the reference value (NO in step S1707), the buffer data moving instructor 1108 selects data having the lowest fragmentation frequency 424 as data to be moved from the buffer 1060 to the storage medium 240. The buffer data moving instructor 1108 refers to the storage medium address 1222 corresponding to the selected data from the buffer management table 1107, and instructs the access executor 1101 to write the selected data in the storage medium 240 (step S1709).

Note that upon receiving the instruction to write the data in the storage medium 240, the access executor 1101 performs processing in accordance with the same procedure as that in step S801 and subsequent steps of FIG. 15A for the data of the write request received from the OS 211 or application 212 operating on the host computer 1010. Therefore, at the time of the write processing in data movement from the buffer 1060 to the storage medium 240, fragmentation state estimation processing and defragmentation processing are executed.

The buffer data moving instructor 1108 switches, to an invalid state, the valid flag 1223, in the buffer management table 1107, corresponding to the data which has been written in the storage medium 240 in step S1709. The size of the data which has been written in the storage medium 240 is added to the free capacity 1210 of the whole buffer 1060. If the buffer 1060 is formed by a device such as a NAND flash for which it is difficult to directly overwrite data, data delete processing is performed for the memory area of the buffer 1060 in which data is stored (step S1711). The buffer data moving instructor 1108 deletes the first data having the lowest fragmentation frequency 424 from the row of the data sorted in step S1703 and stored in the buffer 1060, and restarts the process from step S1703 (step S1713).

By executing the above processes in steps S1701 to S1713, the operation in which the buffer data moving instructor 1108 moves the data stored in the buffer 1060 to the storage medium 240 to resolve a shortage of the free capacity of the buffer 1060 is completed.

According to this example embodiment, storing data in an area estimated in advance to have a high fragmentation occurrence frequency is avoided by storing, in a memory area prepared as a buffer, write data for an area having a high fragmentation occurrence frequency, thereby making it possible to improve the access performance of a storage medium and prolong the life of the storage medium.

[Fourth Example Embodiment]

A storage controller serving as a storage control apparatus according to the fourth example embodiment of the present invention will be described next. The storage controller according to this example embodiment is different from those according to the second and third example embodiments in that the fragmentation state is estimated in accordance with successive storage operations of a file or the like and rearrangement is performed. The remaining components and operations are the same as those in the second and third example embodiments. Hence, the same reference numerals denote the same components and operations, and a detailed description thereof will be omitted.

«Information Processing System»

An information processing system including the storage controller serving as the storage control apparatus according to this example embodiment is the same as in FIG. 2 and a repetitive description thereof will be omitted. Note that this example embodiment may be applied to the third example embodiment to obtain an information processing system including a buffer, as shown in FIG. 10.

«Functional Arrangement of Storage Control Apparatus»

Figure 18:
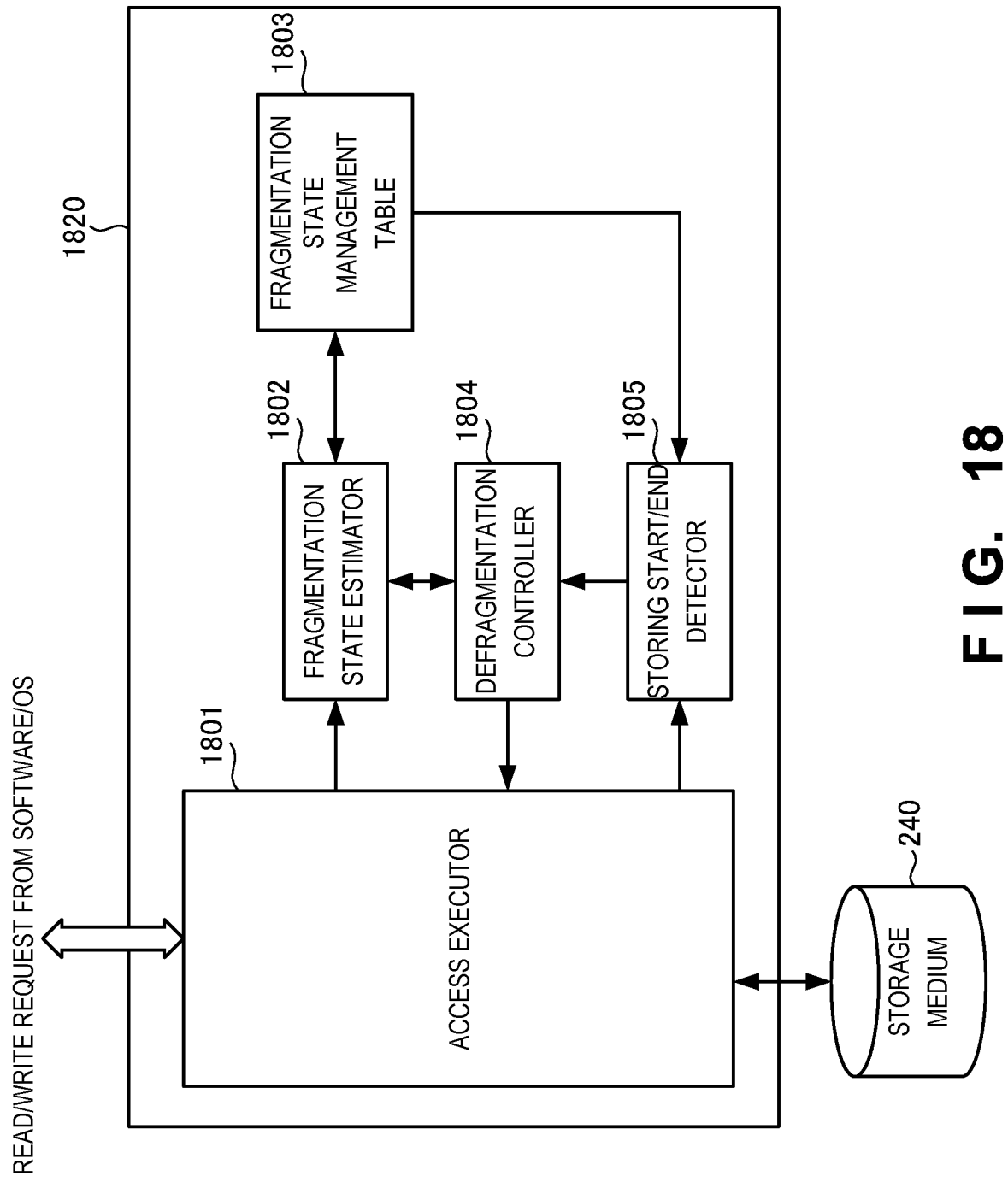
FIG. 18 is a block diagram showing the functional arrangement of a storage control apparatus according to the fourth example embodiment of the present invention.

FIG. 18 is a block diagram showing the functional arrangement of a storage controller 1820 serving as the storage control apparatus according to this example embodiment.

Referring to FIG. 18, the storage controller 1820 includes an access executor 1801, a fragmentation state estimator 1802, a fragmentation state management table 1803, a defragmentation controller 1804, and a storing start/end detector 1805. Note that the access executor 1801, fragmentation state estimator 1802, and defragmentation controller 1804 respectively correspond to the access executor 301, fragmentation state estimator 302, and defragmentation controller 304 of FIG. 3, and the operations thereof correspond to a write request of a series of continuous data received from an OS 211 or an application 212.

The access executor 1801 receives an access request from the OS 211 or application 212, and performs necessary access processing for a storage medium 240. The access executor 1801 reads data from an area, instructed by the defragmentation controller 1804, on the storage medium 240, and performs re-storage processing while controlling or restricting other write operations. Data can be read from the area on the storage medium 240 by requesting a cache 242 (not shown) of the storage medium 240, instead of directly requesting the storage medium 240.

The fragmentation state estimator 1802 records information for estimating the fragmentation state with respect to the series of continuous data of the write request received by the access executor 1801 from the OS 211 or application 212. First, the fragmentation state estimator 1802 receives information about the access destination address of the write request and the size of the write data from the access executor 1801, and updates or deletes information about the storing start timing, size, and total write amount of each set of continuous data stored in the fragmentation state management table 1803. The fragmentation state estimator 1802 estimates the storage state of each set of continuous data in the storage medium 240 based on the information about the size and total write amount of each set of continuous data stored in the fragmentation state management table 1803. More specifically, the mixed status with other data in the memory area of the storage medium 240 in which each set of continuous data is stored is checked based on, for example, the write data amount, the number of simultaneously stored continuous data, and the like by comparing the storage status of each set of continuous data with the storage status of all write data in the storage medium 240, thereby estimating the fragmentation state. For example, if the storage medium 240 is an SSD using a NAND flash as a memory element, the fragmentation state is estimated based on the ratio of each set of continuous data in each block of the NAND flash to the capacity or the number of parallelly stored continuous data.

The fragmentation state management table 1803 stores, as information indicating the fragmentation state of each data, the storing start timing and size of the series of continuous data in the storage medium 240, that are updated by the fragmentation state estimator 1802.

The defragmentation controller 1804 receives a continuous data storing end notification from the storing start/end detector 1805, and acquires the information about the fragmentation status of the continuous data estimated by the fragmentation state estimator 1802 based on the information stored in the fragmentation state management table 1803. Next, the defragmentation controller 1804 determines, based on the information about the fragmentation status, whether to perform defragmentation of the continuous data in the storage medium 240. If it is determined that defragmentation is necessary, the defragmentation controller 1804 instructs the access executor 1801 to read the continuous data from the storage medium 240. Then, the defragmentation controller 1804 instructs to rewrite the data in the storage medium 240 without interposing other write operations by controlling or restricting other write operations. For example, if the continuous data correspond to a file, the continuous data are re-stored from the beginning in a format accessible by the same identifier as that of the currently stored file. If the continuous data are represented by the first address and the amount of continuously stored write data, the series of continuous data are re-stored at the same addresses from the first address.

The storing start/end detector 1805 detects the start and end of storing continuous data in the access executor 1801 from a write request for the storage medium 240. First, upon detecting the start of storing continuous data, the storing start/end detector 1805 adds an entry corresponding to the continuous data to the fragmentation state management table 1803. Upon detecting the end of storing the continuous data, the storing start/end detector 1805 notifies the defragmentation controller 1804 of the end of storing the continuous data. Furthermore, instead of monitoring a write request for the storage medium 240 in the access executor 1801, the storing start/end detector 1805 may detect a write request received by the access executor 1801 from the OS 211, the application 212, or the like, or explicitly detect a continuous data write start/end notification from the OS 211, the application 212, or the like, thereby determining the start/end of storing the continuous data. Furthermore, if no continuous data write request is issued for the storage medium 240 during a predetermined period or during write access of a predetermined amount, the storing start/end detector 1805 may determine the end of storing the continuous data.

(Fragmentation State Management Table)

FIG. 19 is a view showing the structure of the fragmentation state management table 1803 according to this example embodiment. The fragmentation state management table 1803 is referred to by the fragmentation state estimator 1802 to estimate whether fragmentation occurs in the storage medium 240. Note that in FIG. 19, the same reference numeral as that in FIG. 4 denotes the same component.

The fragmentation state management table 1803 stores a total write amount 410 of the current storage medium 240 as information of the whole storage medium 240. The fragmentation state management table 1803 has an entry for each file as a set of continuous data. Each entry stores a file ID 1921, a file size 1922, and a total write amount at start 1923. The file ID 1921 is an identifier for uniquely specifying a file corresponding to the entry. The file size 1922 indicates a total capacity when each file is continuously stored from the beginning until now. The total write amount at start 1923 represents the total write data amount of the storage medium 240 at a timing at which storing of the file corresponding to each entry starts.

Note that the format of the data stored in the fragmentation state management table 1803 is not limited to that shown in FIG. 19. For example, the file size 1922, total write amount at start 1923, and total write amount 410 in each entry are represented in KB (kilobytes) in FIG. 19. However, a different unit may be used. Furthermore, in FIG. 19, the storing start timing of the file corresponding to each entry is represented by the total write amount at start 1923. However, for example, time information can be used. In FIG. 19, the series of continuous data corresponding to each entry of the fragmentation state management table 1803 is represented on a file basis. However, for example, if the host computer operates as an object storage that stores data in the storage medium 240 on an object basis, the series of continuous data may be represented on an object basis. The size of data continuously written from the first address at which write starts can be recorded in each entry as information indicating the fragmentation status of the series of continuous data.

《Processing Procedure of Storage Controller》

Figure 20:
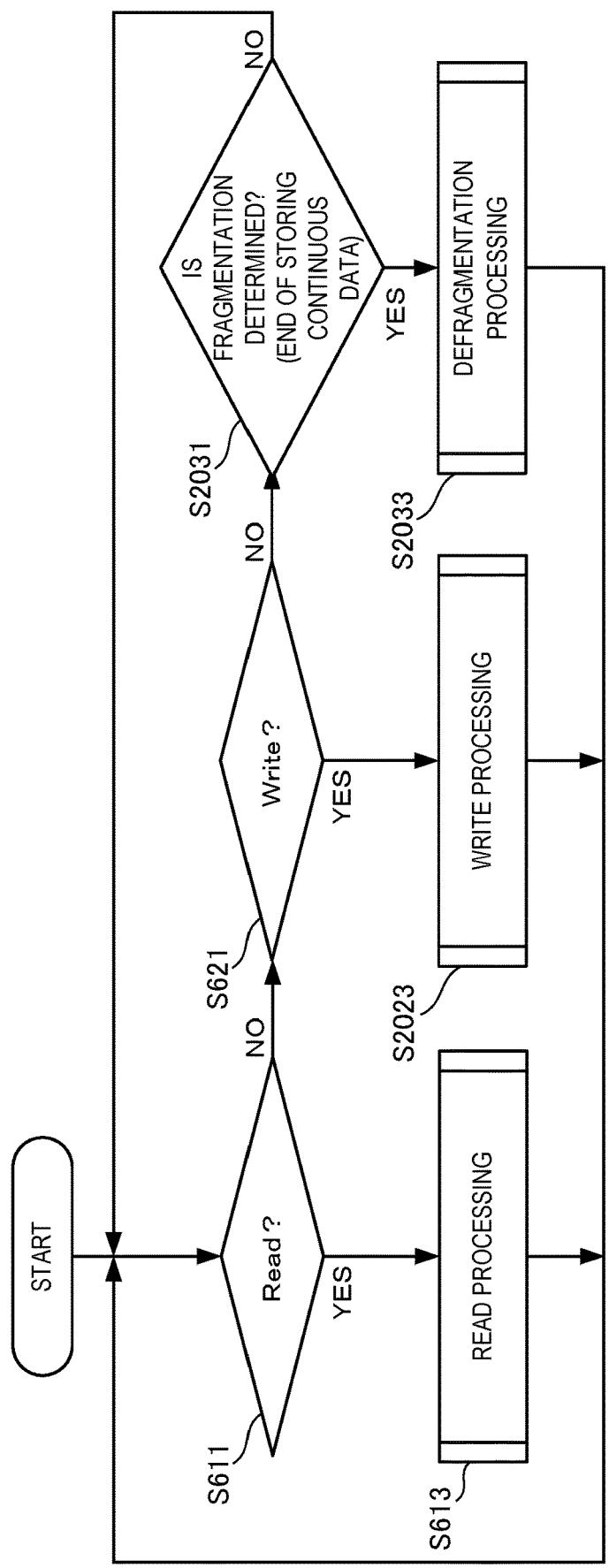
FIG. 20 is a flowchart illustrating the processing procedure of a storage controller according to the fourth example embodiment of the present invention.

FIG. 20 is a flowchart illustrating the processing procedure of the storage controller 1820 according to this example embodiment. This flowchart is executed by a CPU 510 of FIG. 5 using a RAM 540, thereby implementing the functional components shown in FIG. 18. Note that in FIG. 20, the same step numbers as those in FIG. 6 denote the same steps and a description thereof will be omitted.

If the storage controller 1820 determines write processing from the OS 211 or application 212, it executes the write processing in step S2023. The storage controller 1820 determines, in step S2031, the end of storing the continuous data as a fragmentation determination timing, and executes defragmentation processing in step S2033.

(Write Processing)

Figure 21:
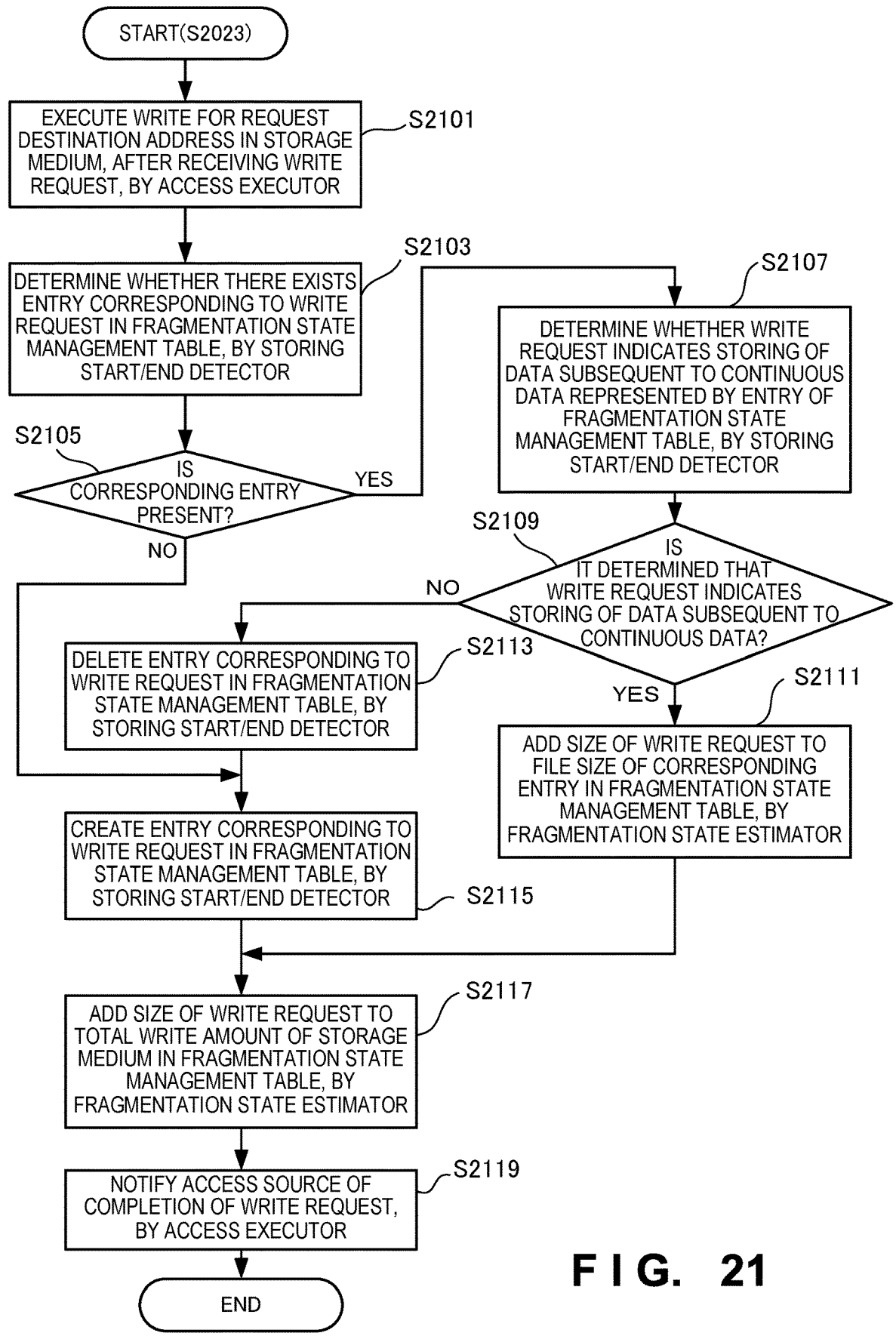
FIG. 21 is a flowchart illustrating the procedure of write processing according to the fourth example embodiment of the present invention.

FIG. 21 is a flowchart illustrating the procedure of the write processing (step S2023) according to this example embodiment. FIG. 21 shows a procedure of receiving a write request from the OS 211 or application 212 operating on the host computer, and recording information for estimating the fragmentation state of the stored continuous data while storing data of the write request in the storage medium 240.

Upon receiving a write request from the OS 211 or application 212 operating on the host computer, the access executor 1801 of the storage controller 1820 executes the write request for a request destination address (LBA) in the storage medium 240 (step S2101).

Upon detecting the write request received by the access executor 1801 in step S2101, the storing start/end detector 1805 refers to the fragmentation state management table 1803, and determines, using the file ID 1921 of each entry, whether there exists an entry corresponding to the recorded continuous data in the fragmentation state management table 1803 (step S2103). If, as a result of determining whether there exists an entry corresponding to the continuous data (step S2105), the corresponding entry is absent (NO in step S2105), processes in step S2115 and subsequent steps are executed.

If the corresponding entry is present (YES in step S2105), the storing start/end detector 1805 refers to the fragmentation state management table 1803, and determines, using the file ID 1921 and file size 1922 of each entry, whether the write request indicates storing of data subsequent to the recorded continuous data in the fragmentation state management table 1803 (step S2107). If, as a result of determining whether the write request indicates storing of data subsequent to the continuous data (step S2109), it is determined that the write request indicates storing of data subsequent to the continuous data managed by the entry of the fragmentation state management table 1803 (YES in step S2109), processes in step S2111 and subsequent steps are continued. The fragmentation state estimator 1802 adds the size of the write request to the value of the file size 1922 with respect to the entry, in the fragmentation state management table 1803, corresponding to the write request received in step S2101 (step S2111).

If it is determined that the write request indicates no write subsequent to the continuous data managed by the entry of the fragmentation state management table 1803 but write for rewriting the data from the beginning (NO in step S2109), the storing start/end detector 1805 deletes the entry, in the fragmentation state management table 1803, corresponding to the write request received in step S2101 (step S2113).

After creating a new entry in the fragmentation state management table 1803, the storing start/end detector 1805 registers the file ID 1921, and sets the data size of the write request received in step S2101 in the file size 1922. The storing start/end detector 1805 sets a value equal to the total write amount 410 in the total write amount at start 1923 of the created new entry, and continues processes in steps S2117 and subsequent steps (step S2115).

The fragmentation state estimator 1802 adds the size of the write request received in step S2101 to the total write amount 410 of the storage medium 240 in the fragmentation state management table 1803 (step S2117). The access executor 1801 notifies the OS 211 or application 212 as an access source of completion of the write request (step S2119), thereby ending the process.

By executing the above processes in steps S2101 to S2119, the operation of receiving a write request from the OS 211 or application 212 operating on the host computer and recording information for estimating the fragmentation state of stored continuous data while storing the data of the write request in the storage medium 240 according to this example embodiment is completed. The write request completion notification in step S2119 may be sent simultaneously with or prior to the processes in steps S2103 to S2117 upon completion of the write request executed for the storage medium 240 in step S2101.

(Defragmentation Processing)

Figure 22:
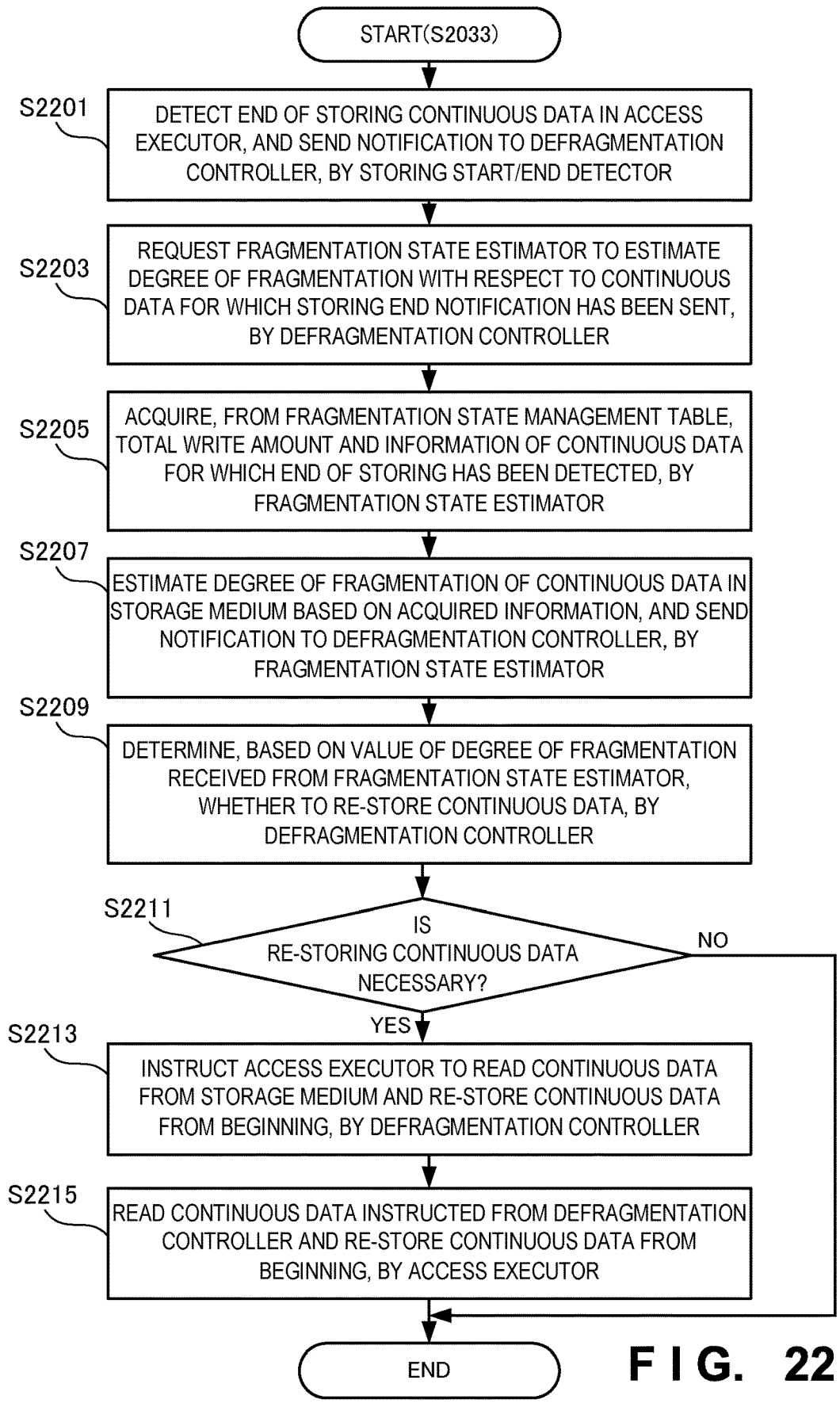
FIG. 22 is a flowchart illustrating the procedure of defragmentation processing according to the fourth example embodiment of the present invention.

FIG. 22 is a flowchart illustrating the procedure of defragmentation processing (step S2033) according to this example embodiment. FIG. 22 shows a processing procedure in which the storing start/end detector 1805 detects completion of storing continuous data, and executes processing of re-storing the continuous data in accordance with a result of estimating the fragmentation status of the continuous data in the storage medium 240 according to this example embodiment.

The storing start/end detector 1805 of the storage controller 1820 detects the end of storing the continuous data based on the execution status of the write processing of the access executor 1801, and notifies the defragmentation controller 1804 of it (step S2201). For example, by receiving a write request indicating the end of the continuous data or a continuous data storing end instruction from the OS 211, the application 212, or the like as a request source, the end of write of the continuous data can be detected. Furthermore, the storing start/end detector 1805 may detect the end of storing with respect to continuous data which have not been written for a long period by adding, as an item, a last access time (not shown) or the value of the total write amount at the time of the last write to each entry corresponding to continuous data in the fragmentation state management table 1803, and comparing the added item with the current time or the total write amount 410 stored in the fragmentation state management table 1803.

The defragmentation controller 1804 requests the fragmentation state estimator 1802 to estimate the degree of fragmentation with respect to the continuous data for which the storage end notification has been sent (step S2203). The fragmentation state estimator 1802 acquires the file size 1922 and total write amount at start 1923 from the entry corresponding to the requested continuous data with reference to the fragmentation state management table 1803. The fragmentation state estimator 1802 also acquires the total write amount 410 corresponding to the storage medium 240 (step S2205). The fragmentation state estimator 1802 estimates the degree of fragmentation of the continuous data in the storage medium 240 based on the file size 1922, total write amount at start 1923, and total write amount 410 acquired in step S2205, and returns the degree of fragmentation to the defragmentation controller 1804. In addition, the fragmentation state estimator 1802 deletes the entry corresponding to the continuous data from the fragmentation state management table 1803 (step S2207).

Based on the value of the degree of fragmentation returned from the fragmentation state estimator 1802 in step S2207, the defragmentation controller 1804 determines whether to re-store the continuous data (step S2209). The determination processing can be implemented by, for example, comparing the magnitudes of the reference value and the value of the degree of fragmentation. As another example, it may be determined whether to perform re-storage processing so that the write amount of the storage medium 240 generated by including internal processing decreases, by comparing the write amount to the storage medium 240 when re-storing the continuous data using the value of the degree of fragmentation is performed with the expected value of the write amount on movement of data in the storage medium 240 caused by fragmentation of the continuous data when no re-storage processing is performed. If, as a result of determining whether re-storing the continuous data is necessary (step S2211), it is determined in step S2209 that re-storing the continuous data is unnecessary (NO in step S2211), the defragmentation controller 1804 ends the process without re-storing the continuous data.

If it is determined in step S2209 that re-storing the continuous data is necessary (YES in step S2211), the defragmentation controller 1804 instructs the access executor 1801 to read the continuous data from the storage medium 240 and re-store the continuous data from the beginning (step S2213). The access executor 1801 executes, for the storage medium 240, read of the continuous data instructed from the defragmentation controller 1804 and write of re-storing the continuous data from the beginning (step S2215). Write of re-storing the continuous data in the storage medium 240 is executed by controlling or restricting other write operations or is executed in preference to another write request so no fragmentation occurs by storing other data during re-storage processing. Upon completion of re-storing the continuous data, the process ends.

(Value of Degree of Fragmentation)

Note that as the value of the degree of fragmentation of the stored continuous data, which is estimated in step S2207, the distribution of the continuous data in the memory area of the storage medium 240 can be used.

When "S" represents the file size 1922 indicating the size of the continuous data, "W0" represents the total write amount at start 1923, and the "W" represents the total write amount 410, the distribution status of the continuous data in the memory area is obtained as a distribution ratio given by (distribution ratio)=S/(W−W0) where (W−W0) represents the total write data amount from the start to completion of storing the continuous data in the storage medium 240.

If the storage medium 240 is an SSD using a NAND flash as a memory element, write data are stored in a write-once manner, and thus data for which a write request has been performed at the same time are mixed and stored in blocks of the NAND flash. That is, the continuous data occupies, on average, a capacity corresponding to the distribution ratio in each of blocks in which the continuous data are stored. As the distribution ratio is lower, the number of blocks in which the continuous data are stored is larger. This means that fragmentation progresses. Alternatively, in step S2205, by checking an entry corresponding to each set of continuous data recorded in the fragmentation state management table 1803, the average simultaneous storage count of the continuous data may be acquired and set as the value of the degree of fragmentation.

By executing the above processes in steps S2201 to S2215, the operation in which the storing start/end detector 1805 detects completion of storing continuous data and executes re-storage processing of the continuous data in accordance with a result of estimating the fragmentation status of the continuous data in the storage medium 240 according to this example embodiment is completed.

Note that the defragmentation controller 1804 determines in step S2209 whether to perform re-storage processing. However, based on the degree of fragmentation of the continuous data estimated in step S2207, the fragmentation state estimator 1802 may directly determines whether to perform re-storage processing. In step S2203, when the storing start/end detector 1805 detects the end of storing the continuous data, the defragmentation controller 1804 requests the fragmentation state estimator 1802 to estimate the degree of fragmentation of the continuous data. However, a procedure may be adopted in which the storing start/end detector 1805 directly requests the fragmentation state estimator 1802 and notifies the defragmentation controller 1804 of a result of estimating the degree of fragmentation.

According to this example embodiment, it is possible to improve the access performance of a storage medium and prolong the life of the storage medium by estimating an area having a high fragmentation occurrence frequency in write access of continuous data and performing defragmentation by rearranging the area estimated in advance to have a high fragmentation occurrence frequency.

[Fifth Example Embodiment]

An information processing system including a storage control apparatus as a storage controller in a host computer according to the fifth example embodiment of the present invention will be described next. The information processing system according to this example embodiment is different from those according to the second to fourth example embodiments in that the storage controller is provided on the storage medium side or outside the host computer via a network. The remaining components and operations are the same as those in the second to fourth example embodiments. Hence, the same reference numerals denote the same components and operations, and a detailed description thereof will be omitted.

《Arrangement of Information Processing System》

FIG. 23 is a view showing the arrangement of an information processing system 2300 including a storage controller 2343 or 2320 according to this example embodiment. Note that in FIG. 23, the same reference numerals as those in FIG. 2 denote the same components and a description thereof will be omitted.

Referring to FIG. 23, a host computer 2310 includes no storage controller according to this example embodiment. As an example, the storage controller 2343 according to this example embodiment is mounted on a storage medium 2340. As another example, the storage controller 2320 according to this example embodiment is connected as an independent apparatus via a network 250. The storage controller 2343 or 2320 may be implemented by software or a one-chip processor.

According to this example embodiment, unlike the second to fourth example embodiments, without limitation to the processing by the host computer, it is possible to improve the access performance of a storage medium and prolong the life of the storage medium by estimating the fragmentation state of the area in write in the storage medium and canceling the fragmentation state by performing rearrangement.

[Other Example Embodiments]

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a control program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A storage control apparatus comprising:
   a determiner that determines whether to estimate that data at a logical address area in a logical address space used by a host computer to access a storage medium is fragmented and stored in a plurality of physical address areas in a physical address space used in the storage medium; and
   a data rearrangement unit that reads the fragmented data by designating a logical address area corresponding to the fragmented data which has been estimated to be fragmented and stored in the plurality of physical address areas in the physical address space, and instructs the storage medium to write the read fragmented data in the logical address area while controlling other write operations, so that the fragmented data is written in continuous physical address areas in the storage medium, wherein said determiner, when a write operation of writing one file as continuous data ends, estimates a degree of fragmentation of the continuous data in the storage medium based on a size of the file, a total write amount of the storage medium at a start of the write operation, and a total write amount of the storage medium at an end of the write operation, and, when the degree of fragmentation is smaller than a third threshold, estimates that the data is fragmented.

2. The storage control apparatus according to claim 1, wherein the write operation of the continuous data is managed on a file basis or on an object basis.

3. The storage control apparatus according to claim 1, wherein, when "S" represents the size of the file, "W0" represents the total write amount at the start of the write operation, and "W" represents the total write amount at the end of the write operation, the degree of fragmentation is given by S/(W−W0).

4. The storage control apparatus according to claim 1, wherein said data rearrangement unit rearranges the fragmented data by reading the whole data estimated to be fragmented and performing a write operation of the read whole data again.

5. The storage control apparatus according to claim 1, further comprising:
   a storage destination decider that controls to write, in a buffer area, write data estimated to be fragmented.

6. A storage control method comprising:
   determining whether to estimate that data at a logical address area in a logical address space used by a host computer to access a storage medium is fragmented and stored in a plurality of physical address areas in a physical address space used in the storage medium; and
   reading the fragment data by designating a logical address area corresponding to the fragment data which has been estimated to be fragmented and stored in the plurality of physical address areas in the physical address space, and instructing the storage medium to write the read fragmented data in the logical address area while controlling other write operations, so that the fragmented data is written in continuous physical address areas in the storage medium,
   wherein, in said determining step, when a write operation of writing one file as continuous data ends, estimates a degree of fragmentation of the continuous data in the storage medium based on a size of the file, a total write amount of the storage medium at a start of the write operation, and a total write amount of the storage medium at an end of the write operation, and, when the degree of fragmentation is smaller than a third threshold, the data is estimated to be fragmented.

7. An information processing system comprising:
   a storage medium;
   an access unit that accesses said storage medium by designating a logical address area in a logical address space; and
   a storage controller that, based on the logical address area designated by said access unit, reads data from said storage medium and writes data in said storage medium,
   said storage controller including
      a determiner that determines whether to estimate that data at a logical address area in a logical address space used by said access unit to access said storage medium is fragmented and stored in a plurality of physical address areas in a physical address space used in said storage medium, and
      a data rearrangement unit that reads the fragmented data by designating a logical address area corresponding to the fragmented data which has been estimated to be fragmented and stored in the plurality of physical address areas in the physical address space, and instructs said storage medium to write the read fragmented data in the logical address area while controlling other write operations, so that the fragmented data is written in continuous physical address areas in said storage medium,
   wherein said determiner of said storage controller, when a write operation of writing one file as continuous data ends, estimates a degree of fragmentation of the continuous data in the storage medium based on a size of the file, a total write amount of the storage medium at a start of the write operation, and a total write amount of the storage medium at an end of the write operation, and, when the degree of fragmentation is smaller than a third threshold, estimates that the data is fragmented.

* * * * *